United States Patent
Lomet et al.

(10) Patent No.: US 7,668,845 B1
(45) Date of Patent: Feb. 23, 2010

(54) C-TREE FOR MULTI-ATTRIBUTE INDEXING

(75) Inventors: David Lomet, Redmond, WA (US); Betty Joan Salzberg, Wayland, MA (US)

(73) Assignee: Microsoft Corporation, Redmond, WA (US)

(*) Notice: Subject to any disclaimer, the term of this patent is extended or adjusted under 35 U.S.C. 154(b) by 508 days.

(21) Appl. No.: 10/891,583

(22) Filed: Jul. 15, 2004

Related U.S. Application Data

(60) Provisional application No. 60/545,728, filed on Feb. 18, 2004.

(51) Int. Cl.
*G07F 17/00* (2006.01)

(52) U.S. Cl. .......................... 707/101; 707/102; 707/2; 707/3

(58) Field of Classification Search .................. 707/100, 707/101, 102, 1–6
See application file for complete search history.

(56) References Cited

U.S. PATENT DOCUMENTS

| | | | |
|---|---|---|---|
| 5,446,887 A | | 8/1995 | Berkowitz |
| 5,752,243 A | | 5/1998 | Reiter et al. |
| 5,761,652 A | | 6/1998 | Wu et al. |
| 5,781,906 A | | 7/1998 | Aggarwal et al. |
| 5,799,301 A | | 8/1998 | Castelli et al. |
| 5,806,065 A | | 9/1998 | Lomet |
| 5,968,109 A | * | 10/1999 | Israni et al. ................ 701/208 |
| 6,047,280 A | * | 4/2000 | Ashby et al. .................... 707/2 |
| 6,122,628 A | | 9/2000 | Castelli et al. |
| 6,134,541 A | | 10/2000 | Castelli et al. |
| 6,219,662 B1 | * | 4/2001 | Fuh et al. ........................ 707/3 |
| 6,252,605 B1 | * | 6/2001 | Beesley et al. .............. 345/441 |
| 6,263,334 B1 | | 7/2001 | Fayyad et al. |
| 6,282,605 B1 | * | 8/2001 | Moore ........................ 711/103 |
| 6,381,605 B1 | * | 4/2002 | Kothuri et al. .................... 707/2 |
| 6,470,344 B1 | * | 10/2002 | Kothuri et al. .............. 707/100 |
| 6,505,205 B1 | * | 1/2003 | Kothuri et al. .............. 707/100 |
| 6,694,323 B2 | * | 2/2004 | Bumbulis .................... 707/101 |
| 7,167,856 B2 | * | 1/2007 | Lawder .......................... 707/3 |
| 2001/0042240 A1 | * | 11/2001 | Ng et al. ........................ 717/3 |
| 2003/0187867 A1 | * | 10/2003 | Smartt ........................ 707/102 |
| 2005/0198008 A1 | * | 9/2005 | Adler ............................. 707/3 |

OTHER PUBLICATIONS

David Lomet, Replicated Indexes for Distributed Data, International Conference on Parallel and Distributed Information Systems, 1996, 12 pages.

(Continued)

*Primary Examiner*—Pierre M Vital
*Assistant Examiner*—Christopher J Raab
(74) *Attorney, Agent, or Firm*—Lee & Hayes, PLLC

(57) ABSTRACT

An abstract indexing structure called a C-tree that it is an access method that exploits search space "containment" is described. The C-tree structure includes objects spaces that overlap, but search spaces that are disjoint. Every part of the search space is indexed by some node. Moreover, every object has a unique location in the index, despite the object space overlap. The C-tree is a tree of pages, typically disk based, like a B-tree, but it handles a greater variety of data, e.g., spatial data, temporal data, etc. In particular, it can handle the indexing of objects that have extents, not merely point data, and hence objects that can overlap. These objects can be indexed without remapping them to a higher dimensional point space. At least one particular aspect of the invention is premised on a notion of an object being contained in some kind of search space.

28 Claims, 11 Drawing Sheets

OTHER PUBLICATIONS

David Lomet, Simple, Robust, and Highly Concurrent B-trees with Node Deletion, ICDE Conference, Mar. 30-Apr. 2, 2004, pp. 18-28, Boston, MA.

David B. Lomet, MLR: A Recovery Method for Multi-level systems, ACM SIGMOD, Jun. 1992, pp. 185-194, ACM.

David Lomet, et al., Access Method Concurrency with Recovery, ACM SIGMOD, Jun. 1992, pp. 351-360, ACM.

Chengwen Liu, et al., Performance Evaluation of G-tree and Its Application in Fuzzy Databases, CIKM 96, 1996, pp. 235-242, ACM.

Ravi Kanth V Kothuri, et al., Quadtree and R-tree Indexes in Oracle Spatial: A Comparison Using GIS Data, ACM SIGMOD 2002, Jun. 2002, pp. 546-557, ACM.

Christian Bohm, et al., Searching in High-Dimensional Spaces—Index Structure for Improving the Performance of Multimedia Databases, ACM Computing Surveys, Sep. 2001, pp. 322-373. vol. 33, No. 3. ACM.

Volker Gaede, et al., Multidimensional Access Methods, ACM Computing Surveys, Jun. 1998, pp. 170-231, vol. 30, No. 2, ACM.

Michael Freeston, A General Solution of the n-dimensional B-tree Problem, SIGMOD '95, 1995, pp. 80-91, ACM.

David B. Lomet, et al., The hB-Tree: A Multiattribute Indexing Method with Good Guaranteed Performance, ACM Transactions on Database Systems, Dec. 1990, pp. 625-658, vol. 15 No. 4. ACM.

David Lomet, et al., Concurrency and Recovery for Index Trees, The VLDB Journal, 1997, pp. 224-240, vol. 6, Springer-Verlag.

Georgios Evangelidis, et al., The hBΛ(II) -tree: A Multi-attribute Index Supporting Concurrency, Recovery, and Node Consolidation, The VLDB Journal, 1997, pp. 1-25, vol. 6, Springer-Verlag.

R. Bayer, et al., Organization and Maintenance of Large Ordered Indexes, Acta Informatica, 1972, pp. 173-189, vol. 1.

N. Beckmann, et al., The R*-Tree: An Efficient and Robust Access Method for Points and Rectangles, SIGMOD Conference, 1990, pp. 322-331.

A. Guttman, R-trees: A Dynamic Index Structure for Spatial Searching, SIGMOD, 1984, pp. 47-57.

J. Hellerstein, et al., Generalized Search Trees for Database Systems, VLDB, 1995, pp. 562-573.

I. Kamel, et al., Hilbert R-tree: An Improved R-tree Using Fractals, VLDB, 1994, pp. 500-509.

M. Kornacker, et al., Concurrency and Recovery in Generalized Search Trees, SIGMOD, 1997, pp. 62-72.

P. Lehman, et al., Efficient Locking for Concurrent Operations on B-trees, ACM TODS 6, 1981, pp. 650-670, vol. 4.

C. Mohan, et al., ARIES/IM: An Efficient and High Concurrency Index Management Method Using Write-Ahead Logging, SIGMOD, 1992, pp. 371-380.

F. Ramsak, et al., Integrating the UB-Tree into a Database System Kernel, VLDB, 2000, pp. 263-272.

J. Robinson, The K-D-B-Tree: A Search Structure For Large Multi-dimensional Dynamic Indexes, SIGMOD Conference, 1981, pp. 10-18.

T. Sellis, et al., The R+- Tree: A Dynamic Index for Multi-Dimensional Objects, VLDB, 1987, pp. 507-518.

Yehoshua Sagiv, Concurrrent Operationa on B-Tree with Overtaking, 1985, pp. 28-37, ACM.

* cited by examiner

C-TREE FOR MULTI-ATTRIBUTE INDEXING

CROSS-REFERENCES TO RELATED APPLICATIONS

This application claims the benefit of U.S. Provisional Patent Application Ser. No. 60/545,728, entitled "A C-TREE FOR INDEXING ONE OR MORE ATTRIBUTES" and filed Feb. 18, 2004, the entirety of which is incorporated herein by reference.

TECHNICAL FIELD

This invention is related to multi-attribute indexing to improve performance of database systems (e.g., geographic information systems (GIS)).

BACKGROUND OF THE INVENTION

There is a significant and growing market in geographic information systems (GIS) for which multi-attribute indexing is highly important. More generally, multi-attribute indexes are useful whenever the same multiple attributes are used repeatedly in queries, as multi-attribute indexes are more selective and more immediately produce the desired candidate query results. Multi-attribute indexing is significant in connection with GIS where queries are very commonly in terms of coordinates of an area of interest. Although several different conventional systems exist that support multi-attribute indexing via object-relational "blades" or "cartridges", for example—these are not integrated deeply into database system(s), and in particular, do not exploit concurrency control and recovery features.

An R-tree is a multi-attribute access method of conventional choice. However, it has a number of problems, including overlapping regions, costly index comparisons, low index node fanout (especially as dimensionality increases), and difficulty in tuning.

Another conventional multi-attribute indexing method is the B-tree. Data in relational databases is frequently stored and retrieved using B-trees. The key of the B-tree frequently involves the concatenation of several fields of the relational table to retrieve small subsets to avoid large scans of potentially huge tables.

A Pi-tree is a multi-attribute indexing method that provides a high concurrency index tree that also supports recovery. The Pi-tree is well-documented in the art.

Currently, the manner in which many database systems optimize multi-attribute queries is to exploit one or more single attribute indexes, occasionally they use concatenated key indexes. However, these conventional approaches require examining substantially more data, typically performing an intersection of results from multiple index searches. There has been on-going work in multi-attribute indexes to improve this situation.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to a novel abstract indexing structure called a C-tree. The C-tree is a tree of pages, typically disk based, like a B-tree, but it handles a greater variety of data than the ordered keys treated by the B-tree. It can handle many forms of data in addition to standard ordered keys, e.g., spatial data, temporal data, etc. At least one particular aspect of the invention is premised on a notion of an object being contained in some kind of search space.

The C-tree is a novel n-ary tree structure that includes pages whose object spaces overlap, but whose search spaces are disjoint. The C-tree includes attributes of a Pi-tree related to concurrency control and recovery, but is differentiated by the way it deals with overlapping object spaces. Like the Pi-tree, every part of the search space is indexed by some node. Moreover, every object has a unique location in the index. The C-tree is an index structure over paginated data. The data pages themselves form a tree structure called the CT. (The "C" in both cases connotes that an access method exploits search space "containment".) The C-tree allows indexing into the appropriate section of the CT so as to rapidly find the data of interest.

Space decomposition at the leaf level of the C-tree defines the CT. Above the leaf level the space decomposition of each level defines the abstract of the CT contained in the C-tree pages in the next level. The C-tree index pages can be organized to reflect this tree organization. Each C-tree index page contains a connected component of the CT abstract for its level. Such a connected component is itself a tree and thus has a root. In a connected component K of the CT tree abstract contained within a single C-tree page, the space description for the CT-tree node is included that is the root of K. Edges are then drawn to the immediately contained nodes (corresponding to pages on the next lower level with side pointers from the leftmost page on that level) and their delegated space described using their object space boundaries. Then edges corresponding to side pointers of the corresponding C-tree pages of these nodes are drawn to the next immediately contained nodes, and so forth. This helps with search speed, as it provides a search tree to follow, instead of having to perform a linear search of all entries within a node. Thus, searching is down the CT for the node of interest. The index term (CT node) with the smallest search space containing the search request identifies the correct C-tree page to access next.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
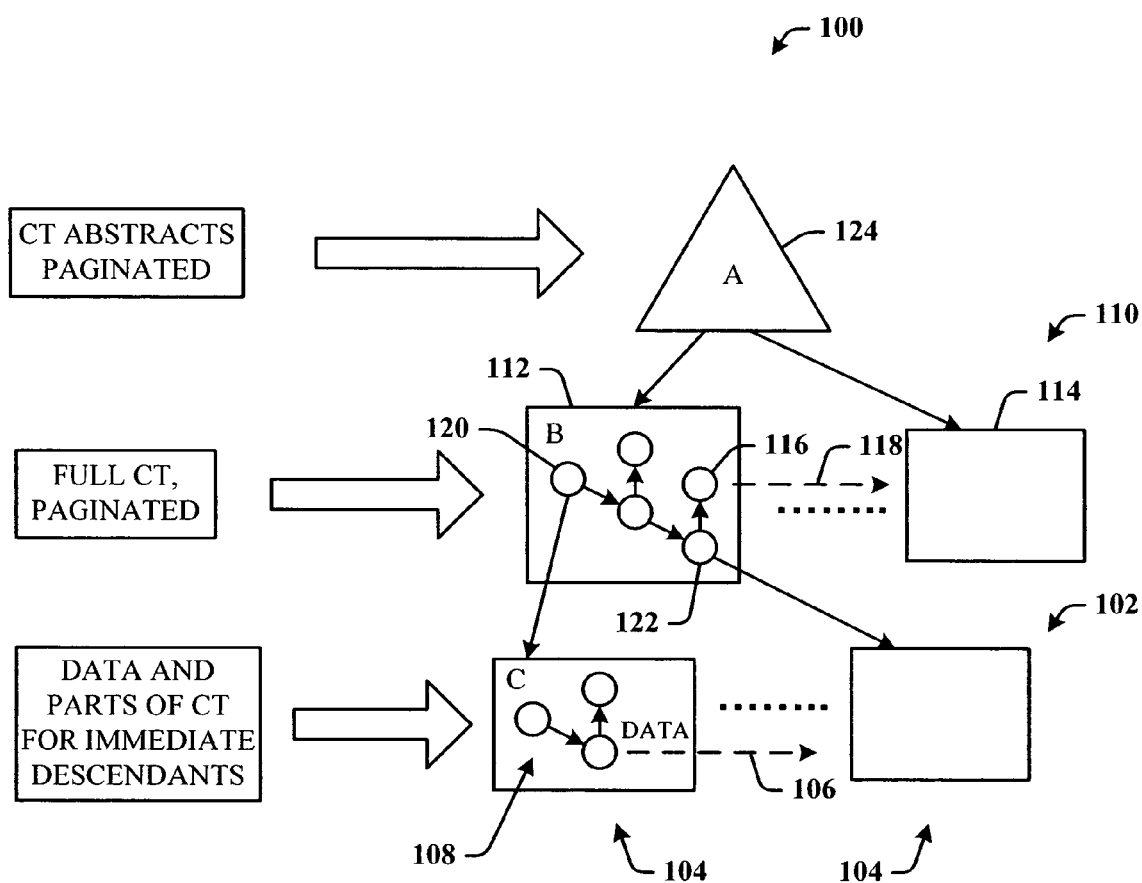
FIG. 1 illustrates a general structure of a C-tree in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The C-Tree

The invention relates to a novel abstract indexing structure called a C-tree. (The "C" connotes that it is an access method that exploits search space "containment".) It is a tree of pages, typically disk based, like a B-tree, but it handles a greater variety of data than the ordered keys treated by the B-tree. It can handle many forms of data in addition to the standard ordered keys, e.g., spatial data, temporal data, etc.

Referring now to FIG. 1, there is illustrated a general structure of a C-tree 100 in accordance with the present invention. The C-tree is a novel structure that includes object spaces that overlap, but search spaces that are disjoint. Every part of the search space is indexed by some node. Moreover, every object has a unique location in the index.

The following describes how search space descriptions are put together to create an effective C-tree indexing structure. The starting point is at a leaf level 102 of the tree 100. Leaf pages 104 of the C-tree 100 contain all the data from which the tree 100 is built. Leaf pages 104 also contain pointers 106 to other leaf pages, which pointers are called side pointers. Side pointers are denoted with dashed lines. Further, each leaf data page 104 contains a small fragment 108 of a containment tree (CT). This fragment 108 describes the search space of the data leaf page 104 and some additional information that describes the search spaces of leaves associated with the side pointers. Thus, C is a leaf page that contains data within its "home" search space and the small fragment 108 of the CT. Further, side pointers 106 in the leaf pages 104 correspond to some edges (called containment edges) in the full CT at the next upper page level 110 of the tree 100. For each C-tree data (leaf) page 104, there is a corresponding node in the CT that represents it and its object and search space. The C-tree is built then by further paginating and indexing the CT so as to permit fast access to the relevant search space. The object or search space of a page in the C-tree and the object or search space of a node in the CT will frequently be referred to interchangeably when the CT node is the index term for the page in the C-tree.

The page level 110, just above the leaf level 102, is the collection of pages that contains the complete CT. Each node of the CT denotes one data page of the C-tree, and the search spaces for the CT nodes act as index terms for the C-tree data pages.

When a page containing a connected component K of the CT is split between two pages, for example, a first (or index) page 112 and a second (or new index) page 114, a subtree T of the component K in the original index page 112 is moved to the new page 114 and there is a CT node 116 in the first page 112 at this page level 110 that has a search space description of the root of the subtree T contained by the second index page 114 and a side pointer 118 to the new index page 114. This is how the CT is put together at this level 110. The other CT nodes, e.g., a node 120 and a node 122, point to data pages 104, as shown in FIG. 1. The original CT-component K can be reconstructed by simply replacing the pointer 118 with the nodes of the CT contained within page 114. Indeed, the entire, unpaginated CT can be reconstructed in this way.

Finally, each of the upper levels 124 (denoted collectively with a triangle A) of the tree 100 above the bottom two layers (102 and 110) contains a subset of the CT nodes of the level below it. These nodes have the space descriptions associated with the index pages of the level below it. It is the maintenance of the information for this subset of nodes that is a challenge, and will be described in the following sections. This supports keeping to a minimum the information posted to the higher levels of the C-tree 100 so that the C-tree 100 will have good page fanout. Thus, the index term posting operation (where the space description for a new page at one level is being posted to its parent page at the next higher level) is monitored closely.

The present architecture is premised on a notion of an object being contained in some kind of search space.

C-Tree and B-Tree

Features of C-trees that are common to B+-trees include the following.

The data is all in the leaf pages. The pages above leaf level are index pages and direct the search via index terms called child index terms, which point down the tree to the appropriate node at the next lower level.

The leaf pages are all at the same distance from the root, i.e., the tree is balanced.

The pages at each level of the tree partition the search space so that a data object can only be placed in exactly one disk page, and search requires the traversal of only a single path.

When a page overflows, a new page is allocated and index terms for the new page are posted to the parent page of the splitting page.

Should a data page split because it overflows, index pages are updated upward in the tree. Splits percolate up the tree, with index page splits also taking place when newly posted information does not fit in the index page.

C-trees closely resemble B-link-trees and Pi-trees. Each C-tree page has one or more side pointer index terms. Each side pointer index term points to another page at the same level of the tree.

C-Tree and Pi-Tree

Characteristics of the C-tree that are similar to the Pi-tree include the following.

A C-tree requires that each side pointer be paired with a description of the search space that can be reached via a traversal of the side pointer. Thus, there is a side pointer index term <key space, side pointer>, not just the pointer.

The referenced page contains data from part of the space described by the index terms for the page containing the side pointer. These index terms describe what is called the "declared space" of the page. Pages referenced via side pointers have their own declared space, which is considered to have been "delegated" by the original page.

Once a page is assigned a declared space, the declared space never changes. The difference between the declared space of a page and the space that it delegates can shrink by subsequent page splits, which involve delegating additional space to other pages. This delegated space is accessible via side pointers. Indeed, an invariant of a page is that its entire declared search space is accessible either within the page or via following side pointers to pages to which search space has been delegated. The home search space of a page, i.e., {declared space—delegated space}, can grow if one of the pages it points to is deleted. The page then acquires the space (and the data) of the deleted page. But a page's declared space cannot change. The set of home search spaces of data pages forms a disjoint partitioning of the entire search space. Indeed, the set of home search spaces of index pages at each level of the C-tree forms a disjoint partitioning of the entire search space.

As mentioned earlier, the data pages at leaves of the C-tree, and their side pointers, form a tree called the CT. Each data page with its search space is represented by a node in the CT. There is one data page, referred to as the left-most data page, with a declared space that is the entire search space. The node representing this page is the root of the CT.

The level of the C-tree right above the leaves contains all the CT nodes. Each level above the parent-of-leaf level of the C-tree contains an "abstract" of the CT of the next lower level. It includes the root of the lower-level tree and a subset of the nodes of the lower level CT.

Two nodes in an abstract are connected by a containment edge exactly when there is a side pointer between the pages at the next lower level of the C-tree. The abstract of a CT at the next higher level of the C-tree represents a pagination of the lower level CT and its nodes reference the pages containing connected parts of the CT at the lower level.

C-trees generalize Pi-trees in two ways. Firstly, a search space need not be the object space. That is, the search space is treated abstractly, and it is partitioned in ways that can deal with overlapping object space descriptions. Thus, while the Pi-tree is only capable of handling point data, the C-tree is capable of handling extended data items (e.g., data with area extents) that can overlap. Such overlapping data makes it impossible to partition the object space. However, a search space can be defined that accommodates areal data. In particular, items that are contained in the object space descriptions of two nodes do not appear in both nodes. All objects have exactly one home. Moreover, the home search spaces of all nodes at a level of the C-tree, partition the search space.

Secondly, the search space description associated with an index term X=<Xspace, Xptr> is the object space description, augmented at times with object space descriptions of other pages. In accordance with the present invention, it is the interpretation of this description that transforms the object space into a search space description. While this is primarily an implementation issue (i.e., how to represent a search space description), it is nonetheless important in keeping the index compact. In other words, when a page P splits, the search space of the new page N is a subset of the search space of the old page P. Sometimes the description of such a space requires describing spaces previously split-off from P.

These generalizations mean that flexibility is greatly increased in how data objects are partitioned into pages. Moreover, objects that overlap (in object space) can be handled and separated into disjoint partitions of search space. More precisely, there are three "search spaces" of interest for a page P and its corresponding CT node N: its declared space declared(N); its home space home(N); and, its delegated space delegated(N). When a page P is first created, it is assigned declared(P), that is part of the search space. All data within declared(P) is accessible via accessing the page, either because the data is in the page, or because it can be reached via side link traversals from the page. Data in delegated(P) is accessible via side link traversals to successors of P, denoted as succr(P). That is, delegated(P)=∪{declared($P_j$))|$P_j$ in succr (P)}. Data in home(P) is stored directly in P. The home space is the declared space that is not delegated, i.e., home(P)=declared(P)–delegated(P).

Because C-trees satisfy Pi-tree properties, the concurrency control and recovery strategies for Pi-trees (and B-link trees) work for C-trees as well. This is but one important aspect of an advantage of the C-tree versus, e.g., R-trees.

A page split expands the number of pages that deal with some part of the search space. A new page $P_n$ is created with declared($P_n$) ⊂ declared($P_o$) of the old page $P_o$, and with declared($P_n$) becoming part of delegated($P_o$). Further, declared($P_n$) is disjoint from declared($P_s$) for any other successor of $P_o$. The first data page $P_l$ of the C-tree has declared ($P_l$)=the entire space.

One example that distinguishes what is meant by "search space" and "object space" involves geographic information systems (GIS). Consider an application in which pictures, maps of, or features are to be indexed with extents of geographic areas. The object space for this is simply the space, perhaps defined by latitude and longitude, of the area covered by the application.

Two things need to be performed in order to successfully build a C-tree index that permits the search "geographically", i.e., by the location of objects in the object space. Firstly, each object needs to be described in a way that is convenient for the indexing strategy. Here, the most common technique is to use the minimum bounding box for an object as the feature by which it will be indexed. There is a long tradition of doing that in GIS. Thus, this is used in the example.

Secondly, the search space is described in such a way to effectively partition it for the C-tree search. However, when objects overlap, which is clearly possible, a clean partitioning of the "object space" is no longer possible. Conventional Pi-trees require the conversion of the bounding boxes of objects of d dimensions to points of 2d dimensions, and then indexing of the points. Since points do not have extents, they never overlap (unless they are identical) and hence, the resulting point space can be conveniently partitioned. However, doubling the number of dimensions aggravates the "curse of dimensionality" in which, the higher the dimension, the worse the performance of range queries.

In contrast to Pi-trees, however, C-tree objects do not need to be mapped to points. The disclosed search space can continue to be the original geometric space of the objects, but with a specific interpretation of what it means for an object to be part of a search subspace.

Figure 2:
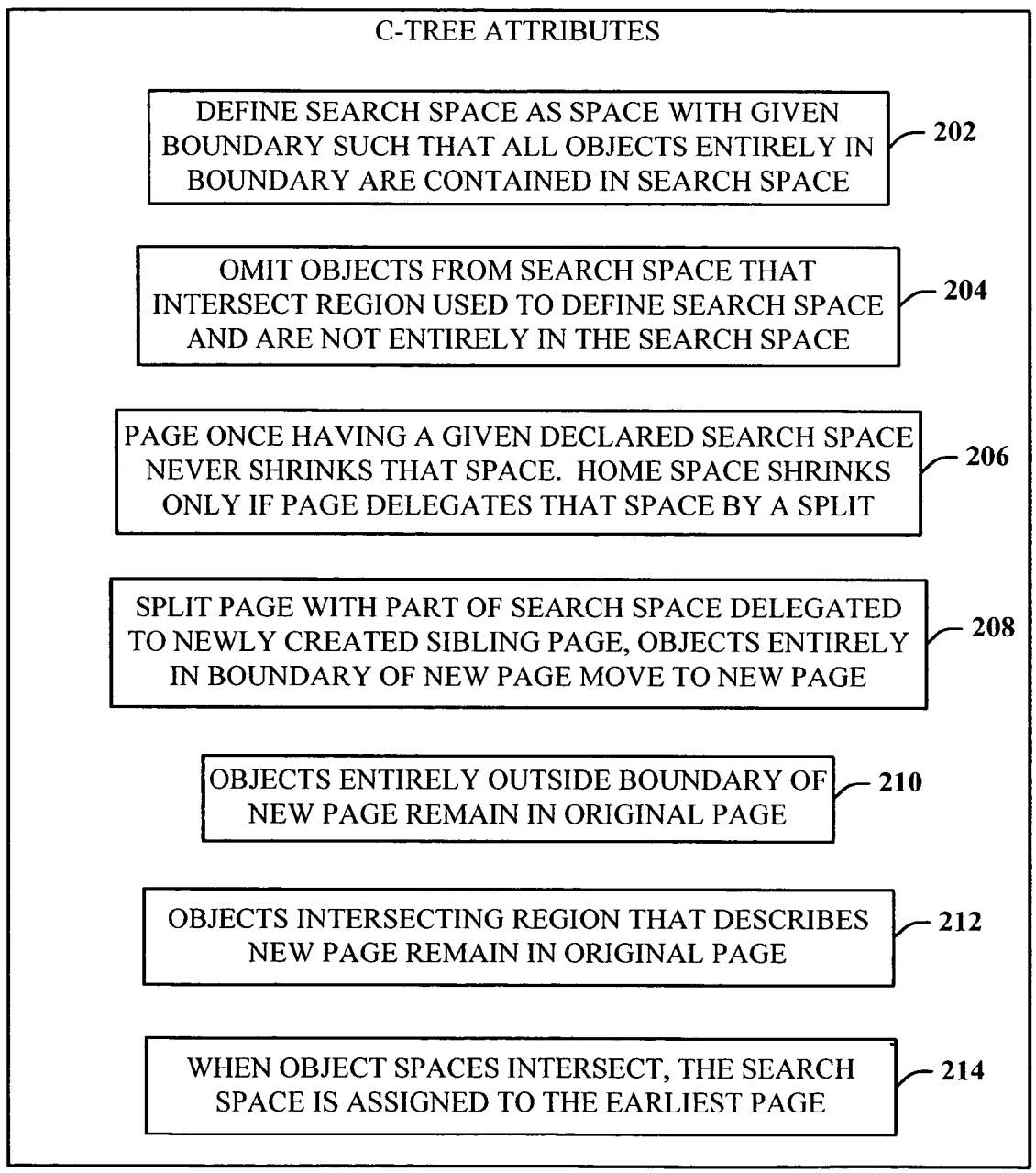
FIG. 2 illustrates a table of attributes associated with one implementation of a C-tree of the present invention.

There can be multiple ways to do this, but a very convenient way is to begin by defining a number of attributes of one implementation of a C-tree. Referring now to FIG. 2, there is illustrated a table 200 of attributes associated with one implementation of a C-tree of the present invention. An attribute 202 indicates that a search space is defined as the space with a given boundary such that all objects entirely within the boundary are contained in the search space. At attribute 204, objects that intersect the region used to define the search space, and are not entirely in the search space, are omitted from the search space. At attribute 206, a page once having been given declared search space never shrinks that space. Its home space shrinks only if the page delegates that space. At attribute 208, when a page is to be split, and part of its search space is to be delegated to a newly created sibling page, objects that lie entirely within the boundary of the new page are moved from the original page to the new page. At attribute 210, objects entirely outside the boundary of a new page remain in the original page. Attribute 212 indicates that objects that intersect the new page region remain in the original page. This is not an exhaustive listing of attributes for the C-tree, but provides a basis for describing the relationship of objects and search spaces. An attribute 214 indicates that when object spaces intersect, the search space is assigned to the earliest page.

Pure Object Space Example

Figure 3:
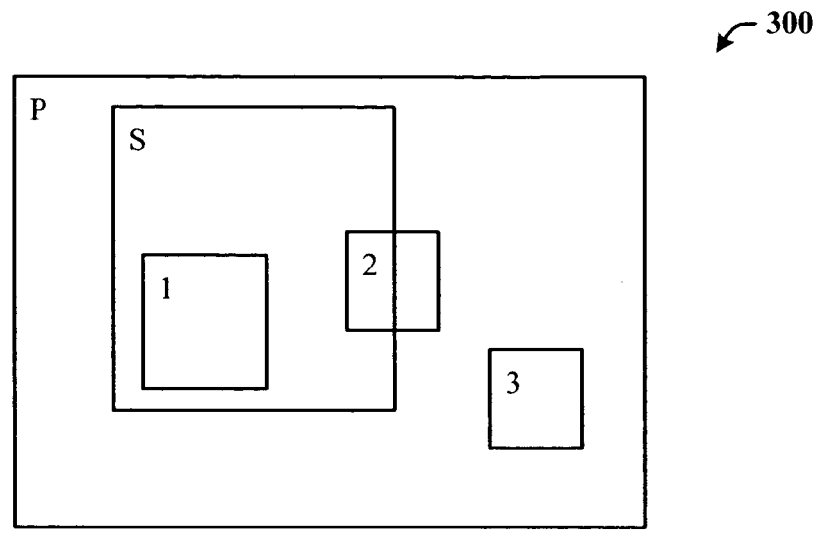
FIG. 3 illustrates an example of a pure object space where areal objects are paginated with nested bounding rectangles in accordance with the present invention.

Referring now to FIG. 3, there is illustrated an example of a pure object space 300 where areal objects are paginated with nested bounding rectangles in accordance with the present invention. Three data objects (1, 2, and 3) are illustrated. A page P, currently containing all these objects, is chosen to be split by delegating space to a new page S. Data object 1 clearly belongs to page S, since it is contained wholly inside page S. Data object 3 clearly continues to belong to page P, since it is not in page S. Data object 2, because it is not fully contained in the object space boundaries for S, does not belong to S's search space, and hence, continues to belong to page P's search space.

The page in which a data object is placed among a collection of pages, where the declared search space of some pages is contained in the declared search space of others, is the page whose declared space is the smallest search space fully containing the data object.

When specifying the object space that accompanies the pointer in an index term, the containing spaces to constrain or qualify the search space description can be used. For example, were page S to be derived from page P using a partition on a single attribute, only that partitioning attribute value need be chosen as a descriptor for the space if the index page is structured that the other border attribute values can be determined from descriptions of the object spaces of pages whose corresponding CT nodes are "higher" in the CT (i.e., from P).

It is not required that the object spaces used to define a search space be either strictly contained or disjoint from the spaces of other pages. Rather, such object spaces can be permitted to intersect, so long as it is clear how to interpret the resulting search space definitions. Our examples use only the bounding rectangle as the object space descriptor, paired with a pointer in the index term. However, intersecting object spaces result in a more complex search space description for the index terms for pages.

Intersecting Object Spaces

Figure 4:
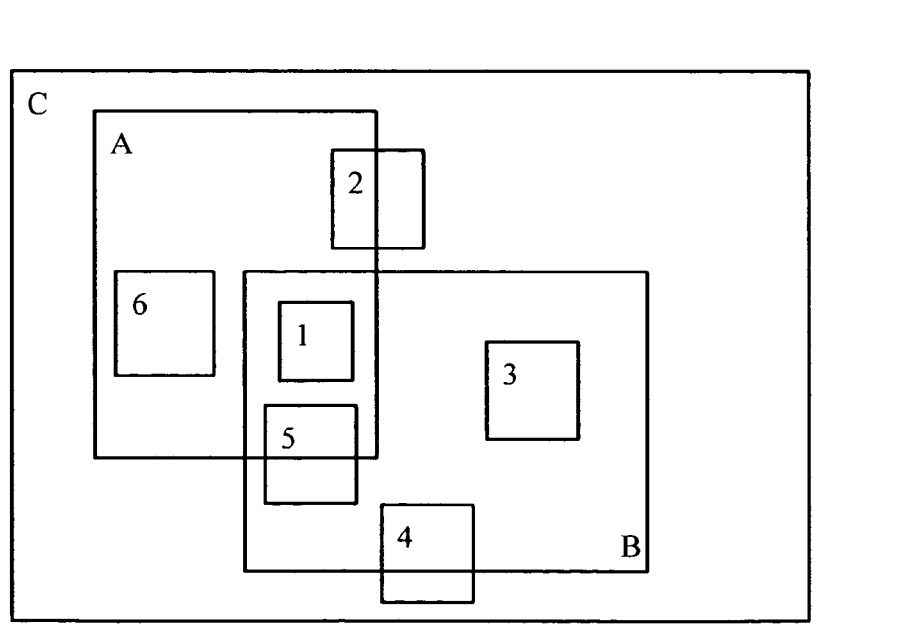
FIG. 4 illustrates an example of a collection of areal objects paginated with intersecting object space bounding rectangles in accordance with the present invention.

Referring now to FIG. 4, there is illustrated an example 400 of a collection of areal objects paginated with intersecting object space bounding rectangles in accordance with the present invention. Here, object spaces for page A and page B, both contained in the search space of page C, intersect. Objects 2 and 4 belong to C's search space, since they are not completely contained in either the object space of A or the object space of B. It is also clear that object 6 belongs to A's search space, since it is totally within A's object space and not within B's object space. Similarly, object 3 is entirely in B's object space and disjoint from A's, hence, belonging to B's search space. Because object 5 is completely contained in B's object space, and only intersects A's object space, it is clear that object 5 also belongs to B's search space.

Object 1, on the other hand, is completely contained within both A's and B's object space boundaries. Hence, another attribute of the C-tree is invoked. A page, once having a given declared search space, never shrinks that space. A page may only delegate that space (by means of a page split), hence shrinking its home space but not its declared space. Thus, object I belongs to A or B's search space depending on which of these pages was first instantiated. Assume page A is first instantiated. Then object 1 is inside of A's declared search space, but not B's. B's full search space declaration is then Declared(B)=[the space containing objects totally within B's object space boundary]−[objects totally within the intersection of A's and B's object spaces]. When B is created via a page split of C, A already has a declared space that includes objects within the object space intersection of A and B. Hence, C cannot delegate that space to B, since C no longer has it. Note also that before B is created, there may be objects in the intersection of A's object space and B's object space that have already been placed in A. Our rule ensures that these objects will remain in A, and not be moved to B.

What is accomplished with careful separation of object space from search space is much greater flexibility in how pages are split in the C-tree. This flexibility makes it much easier for the C-tree to respond to data distributions, including subsequent insertions that produce changes in the overall distribution of the data. This is done while retaining the disjoint partitioning of search space, even while the object spaces are not disjoint.

The definition of search space relative to object space results in larger objects (those that do not fall entirely within object space delegated to another page) to be stored in a small number of pages whose corresponding CT-nodes are high in the CT. These large objects are exactly the objects that will be retrieved most often when intersects and contains queries are made. Because they are separated from the smaller objects into this small number of pages, these pages can be cached in main memory, the result being to produce excellent query performance for contains and intersects queries. That is, even with ordinary Least Recently Used (LRU) caching, these pages will be heavily used and likely to stay in the cache. LRU refers to an algorithm that sorts items according to the time last accessed, and then discards the oldest items in the list to free up needed space.

C-Tree Search Spaces

Splitting a data page produces a new page in the C-tree and a corresponding new node in the CT, and the CT is the basis for indexing in the C-tree. If the CT is maintained as a single unified structure separate from the data pages, in which each data page is identified by an index term consisting of its declared search space and a pointer to it, the CT can be used directly to find the unique data page of the C-tree in which any given object must reside. Note that the CT is much smaller than the collection of the data in all the data pages, and that only the CT nodes corresponding to pages in the containment hierarchy of pages containing an object need to be traversed to find an object. That is, searching for objects contained in a space is down the CT starting from the root node, which corresponds to the leftmost C-tree page that contains the entire search space, and looking for the node that corresponds to the page with the smallest declared search space containing our requested space. In case there are two pages, neither of whose object space contains the other's and both containing the requested space, choose the one created earlier as its declared search space is the containing search space for the object.

The CT

Information is now defined that is known about a CT node and its position in the CT. (Any space description for a node of the CT refers to the declared space for the node.) The object space for a CT node N is denoted by ob(N), the search space by search(N).

Definition—Immediate container: If ob(A) contains ob(B) and any node X whose object space contains ob(B) also contains ob(A), then A is the immediate container of B. Further, B is an immediately contained node of A.

Definition—Sibling nodes: If two nodes B and C have a common immediate container A, then B and C are sibling nodes.

Notation—Earlier: A is "earlier" than B if the page corresponding to A was created earlier than the page corresponding to B, and is denoted as A<B.

Definition—Earlier/Intersects: A earlier/intersects B if A<B AND ob(A)∩ob(B)≠φ, AND NOT (ob(A)⊆ob(B) OR ob(B)⊆ob(A)). This is denoted as A<<B. (A refinement of << is described later.)

Definition—Earliest contained node: B is an earliest contained node of A if B is an immediately contained node of A and there is no node C immediately contained in A such that C<<B.

Definition—CT: A "tree" whose nodes have object space descriptions and pointers to pages, and in which all sibling nodes are connected by sibling edges such that if B and C are siblings with B<<C, then there is a "sibling" path from B to C. Additionally, there is a "contains" edge from an immediate container A to an earliest contained node of A.

Figure 9:
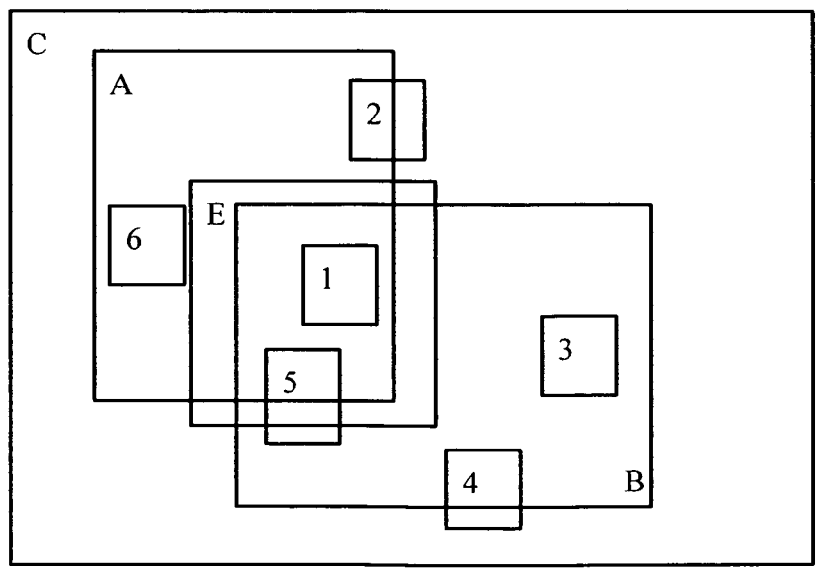
FIG. 9 illustrates an example search space where two nodes have intersecting object spaces, but where the search space of the later is not impacted by the object space of the earlier.

The importance of this is that if A <<B, then objects in ob(A)∩ob(B) are not in the search space of B. The CT should capture this. This may not imply that they are in the search space of A as illustrated in FIG. 9, but this is a safe approximation. Thus, A <<B means there is a path from A to B in the C-tree so that any such A is encountered before B in a search.

The CT is an n-ary tree structure. A node of an n-ary tree can have many children. Such data structures are not conveniently represented by storing a collection of pointers in a node all pointing to different children of the node. Each node has an unknown number of children, and hence putting pointers in nodes requires a count field or alternatively an indication of the end of the node information. This complicates efficient storing and manipulating of the CT.

Rather than using a variable length node representation, a representation is used in which a node points to a first child. Each child (indeed, each node) has both a pointer to its first child, and to its next sibling node (another node that is also a child of the same parent node). This very natural data structure can be exploited for keeping track of the earlier/intersects (<<) relationship between sibling nodes. This can permit the determination of when object spaces for siblings intersect and which sibling contains the space in the intersection. Thus, object spaces of earlier intersecting siblings are part of the search space description for a node (the earlier/intersecting nodes for a node N are denoted as EI(N)).

Nested Object Space Descriptions

Figure 5:
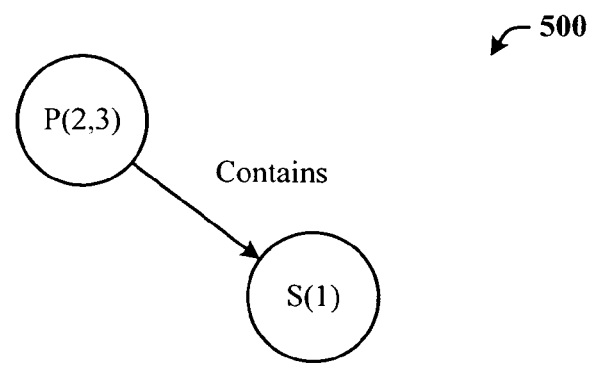
FIG. 5 illustrates a resulting CT of the present invention for the pure nested object spaces example of FIG. 3.

Referring now to FIG. 5 there is illustrated a resulting CT 500 of the present invention for the pure nested object spaces example of FIG. 3. For nested object spaces, the object space boundary of a page can be used directly to describe the search space for the page. Thus, in FIG. 3, the object space boundaries (the bounding rectangle) for P and S can be used. This is with the understanding that only objects completely within the object space boundaries of a page are within its declared search space. The resulting CT 500 is shown in FIG. 5, where the object ids for the objects are included in each node (in parentheses).

As indicated before, the space decomposition at the leaf level of the C-tree defines the CT. Above the leaf level the space decomposition of each level defines the abstract of the CT contained in the C-tree pages in the next lower level. The C-tree index pages can be organized to reflect this tree organization. Each C-tree index page contains a connected component of the CT abstract for its level. Such a connected component is itself a tree and thus has a root. In the connected component K of the CT tree abstract contained within a single C-tree page, the space description for the CT-tree node is included that is the root of K. Edges are then drawn to the immediately contained nodes (corresponding to pages on the next lower level with side pointers from the page corresponding to the root of K on that level) and their delegated space described using their object space boundaries.

Recall that the CT is represented using a data structure where there is only a single edge from a containing node to its immediately contained nodes, namely to its first immediate contained node. Subsequent immediate contained nodes are connected by sibling pointers from earlier immediately contained nodes. These sibling pointers are a representational "device" only. In the conceptual CT, each of these immediately contained nodes has a "contains" edge from the containing node.

Then edges corresponding to side pointers of the corresponding C-tree pages of these contained nodes are drawn to the next immediately contained nodes and so forth. This helps with search speed, as it provides a search tree to follow, instead of having to perform a linear search of all entries within a node. So searching is down the tree for the node of interest. The index term with the smallest object space containing the search request is the correct page to access next.

Optimization

An optimization to the above CT representation is to list only the object space boundaries of a node that differ from the object space boundaries of its parent in the CT. Essentially, an index term would then inherit its not-directly-specified boundaries from its containing parent. Such a strategy might produce a kd-tree like structure when each page introduces only one new boundary, and should each page split be accomplished by using exactly one attribute. However, even where this is not the case, shared boundary values can be inherited.

Intersecting Object Space Descriptions

Figure 6:
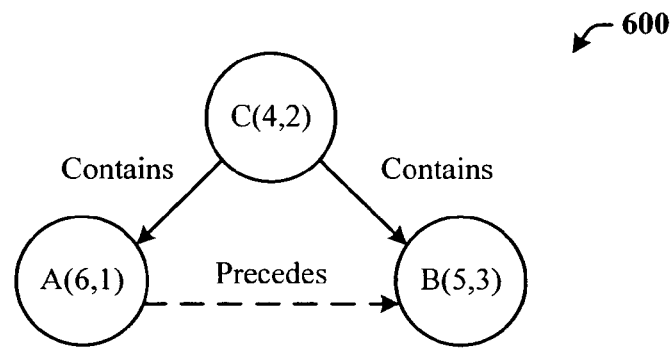
FIG. 6 illustrates an intersecting object space description of the search space of FIG. 4 as represented by a CT, in accordance with the present invention.

Referring now to FIG. 6, there is illustrated an intersecting object space description 600 of the search space of FIG. 4 as represented by a CT, in accordance with the present invention. When object spaces intersect, using object spaces as descriptors for search space becomes more complicated. Descendents of a containing node of the CT should be searched in "precedes/intersects" order, by following sibling edges.

Looking at FIG. 6, it can be seen that node A precedes node B in the list of siblings that are children of C. Because of this, and because the object space A n B is non-empty, any object within this intersection is assigned to the page corresponding to node A. Having the nodes of a sibling list in earlier/intersects (<<) order is useful for searching because the sibling ordered search can be stopped as soon as the first node whose corresponding page's object space contains the object of interest is found. That page's declared search space contains the object of interest.

So, to describe a page P whose search space is less than its object space because of pre-existing pages whose object spaces intersect requires knowledge about EI(N), where N is the CT node indexing P, the set of earlier/intersecting pages of N wherever it is desired to describe P's search space. This will complicate the pagination of the CT and the posting of index terms for such nodes.

Updating the CT when a Data Node Splits

When a data page of the C-tree splits, this forms a new node N in the CT. This new node N needs to be posted in the paginated CT that is stored at the level above the leaf level in the C-tree. This is actually the simplest form of index maintenance. The CT is searched at this level above the leaf level for the object space of N. When the node C with the smallest search space containing new node N is found, new node N is added as the last immediate descendent of node C. Any descendents of node C that are contained within new node N become descendents of N, ordered as they were when descendents of node C.

Paginating the CT

There are at least two reasons why the CT needs to be paginated. Firstly, access methods are intended to be used for disk based data. Hence, the index for the disk based data should itself be on the disk. Thus, some pagination is inevitable, since databases read data in page sized units between disk and main memory. These page size units are typically also units of concurrency control and recovery. Secondly, it is useful to be able to index more directly to the part of the CT that is relevant for a search. This is especially important when the search is for objects "contained" within the query region. Thus, an index that can access the pages of the C tree in such a way as to speed-up the search is very desirable. This same consideration has led to many index-based structures such as B-trees. Thus, a C-tree has a number of levels, each containing a "more abstract" CT structure, and indexing of the level below it. Thus, the CT itself is paginated at the parent of leaf level of the C-tree and in each yet higher level, the CT abstracts are paginated to improve search performance.

With strict object space containment, pagination and indexing can be achieved in a very straightforward way while using only object space descriptions. Pages at the parent of leaf level contain connected components of the CT. Connected components of trees are themselves trees. Any connected component K of the CT can be paginated at any subtree of K (i.e., the new page's content consists of a subtree of the original page's tree) with the description of the search space for the new page as simply the object space associated with the subtree. That is, the object space description of the root node of this subtree serves as the space description of the index term for the new page in the C-tree parent page of the index. Things become more complicated when there is not a convenient subtree at which to do the split, i.e., one that will induce a reasonably even split of the contents between old page and new page. This problem may be sufficiently uncommon in that it does not greatly impact the overall storage utilization of the C-tree. However, in a situation where utilization is adversely impacted, one implementation is to take multiple sub-trees and put them in the same C-tree page.

Dealing with the CT or a CT-abstract when EI information qualifies a node's search space is harder, as it requires that the EI information be used in the index term at the parent to fully describe the referenced page's search space. Wherever a C-tree page is split, further dividing the CT, an index term is posted that must have sufficient information so that the declared search space of the associated page is known. EI information can complicate the search space description of a node that is the target of such an edge, and can further complicate the search space description of its contained descendents. Two ways of dealing with this difficulty include the following.

Object Space Node: split a page whose search space is completely specified by its object space. Two considerations for successfully taking this approach include the following. Firstly, nodes need to be identified for which an object space description is sufficient. This is straightforward when there is such an ancestor node and no intervening nodes with EI spaces. Such nodes satisfy the requirement. However, once one node appears with EI spaces, it needs to be determined when and whether there are subsequent descendent nodes for which a pure object space description is sufficient to describe the search space. Secondly, there may be a fair number of CT nodes that do not have pure object space descriptions, constraining a choice of where an index page split can be done.

Any Node: Split any page, but simplify the search space description as much as possible. The effect of EI spaces must then be represented in index terms to capture the correct search space.

Referring again to FIG. 6, consider that it is desired to split the CT at node B. The index term for node B includes both its object space description and information about A's object space intersection with B. Moreover, if B has descendents, a descendent D could be impacted by the intersection of B with A, and by subsequent EI spaces of nodes that are ancestors of D but descendents of B. It is hence desired to split at CT nodes with simpler (shorter) search space descriptions, e.g., only object space descriptions.

Given the CT (or an abstract of the CT at a higher level of the C-tree), the search space descriptions for each page can be determined. However, this also needs to be addressed when the CT (or an abstract of the CT) has been paginated. What is pursued here is to store in an index page not only a connected component K of the CT (or of an abstract of the CT), but also a description of the search space associated with the root of K.

Then the same techniques can be used that were previously exploited to determine a non-root node's search space description.

Restricting the CT and Data Page Splitting

It is desired that three properties be true for CTs (or CT-abstracts) in order to allow efficient processing. In this section, "CT" refers both to the CT which is stored only at the parent-of-leaf level of the C-tree and also to the CT-abstracts which are stored at higher levels of the C-tree. In the following, a simplified notation "search (resp object) space of a CT-node" for "search (resp object) space of the page associated with a CT node" is used.

Property 1: In the CT, if ob(N) $\subset$ ob(M), then search(N) $\subset$ search(M), which permits M to be a container for N in the CT. This permits searching the CT using object space comparisons.

Property 2: The object space description for any node M in the CT that owns the intersection of object space with a later sibling node N appears as a predecessor of N in its sibling list in the CT. That is, the node object descriptions on the sibling list are used to capture the object space intersections that define a node's search space.

Property 3: An object space description for any node appears only once in the graph used to represent the CT. This simplifies algorithms and reduces the storage requirements for the C-tree index.

If the choice of object space boundaries is not restricted, these properties could be violated. An object space description for a node might appear twice in the CT; once to describe the search space for the node, and another time to play a role of reducing the search space of a node that is a later sibling with which its intersection is non-empty.

Figure 7:
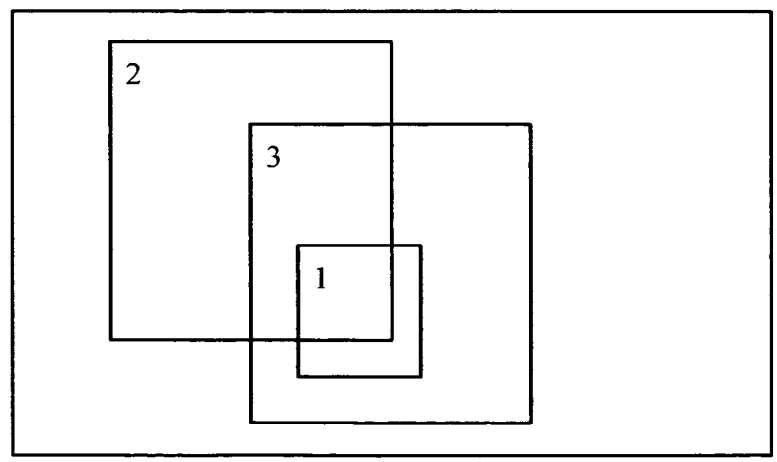
FIG. 7 illustrates a sample search space where object spaces are not restricted.

Referring now to FIG. 7, there is illustrated a sample search space 700 where object spaces are not restricted. The nodes "1", "2", and "3" have been named to clearly indicate the order in which they were created. Note that the object space of node 1 is completely contained in the object space of node 3. Further, node 2 object space is subtracted from the object space of node 3 in determining the search space of node 3. Finally, the object space 1 must be subtracted from the object space for node 2 in determining the search space for node 2. So the object space for node 1 must (by property 1) appear in the CT as contained in node 3, but must also appear in the precedes list for node 2 by property 2. It thus appears in two places in our graph representing the CT, hence violating property 3, Note that the problem does not exist if node 2 was created earlier than node 1.

Figure 8:
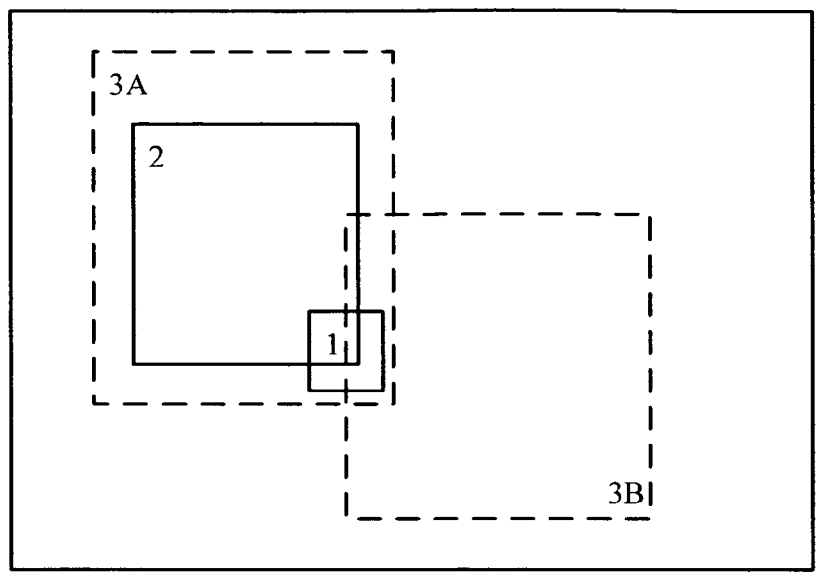
FIG. 8 illustrates a search space that shows two ways that node 3 of FIG. 7 can be redefined in order for the CT to conform to the three properties, in accordance with the present invention.

Referring now to FIG. 8, there is illustrated a search space 800 the shows two ways that node 3 of FIG. 7 can be redefined in order for the CT to conform to the three properties, in accordance with the present invention. Node 3 can be redefined as a node 3A or a node 3B. Node 3A's object space contains both the object spaces for nodes 1 and 2, so ob(1) would only occur once in the CT (contained within 3A and on the precedes list of 2, which is also contained in 3A). The second alternative (3B) is where the object space of 3B does not include the object space of node 1. Hence ob(1) is on the precedes list of both 2 and 3B, and is not contained in 3B.

In the sequel, it is assumed that the three properties above always hold. In order for this to be true, care is exercised whenever a node is added to the CT via a C-tree data page split. No such care is required when a C-tree index page is split at the root of a subtree of the CT nodes contained in the CT index page. This results in the posting of the subtree root as the index term, but does not introduce new CT nodes. Hence, the following restrictions are imposed on data page splitting.

Restriction R1: In order to introduce a new data page X whose object space contains that of an existing data page Y, the object space of page X also contains the object space of any page Z created after Y with which page Y's object space intersects.

Translated to the example above, assuming nodes 1, 2 and 3 correspond to data pages; when node 3 is introduced, if it's object space is to contain that of node 1, then it must contain that of any node that node 1 intersects and precedes (i.e., node 2). Restriction R1 is thus a restriction on data page splitting, and only needs to be enforced during that process.

Another restriction is worth making explicit to exploit defining index posting and index searching operations.

Restriction R2: A new page N cannot be split from page A when N has an object space that is totally within the intersection of the object space of A with the object space of another page B which was created earlier than A and where B's search space hence contains the object space of N.

Enforcing R2 costs nothing, as it is pointless to assign a page whose entire search space is by necessity empty. No objects will ever be contained in such a space as the search space of B will contain anything that is within N's object space. In other words, a new page N being split from a page A must have an object space that is uniquely contained within the search space of A. Thus, ob(N) $\subseteq$ ob(A) and not ob(N) contained in any node in EI(A). This means that one can find a page by searching for its object space in the earliest sibling that contains, it at any level of the CT.

Refining Search Space Descriptions

Including all the nodes that precede a node and might intersect it when posting an index term is clearly unnecessary. First, the object spaces that are disjoint from the object space of a node do not need to be included in the "precedes" list. For example, given two sibling nodes M and N with M the earlier node, if N$\cap$M=$\phi$, then M can be removed from the description for N even though M precedes N on a sibling list.

Predecessors of the parent node might need to be included in the description of the search space of the new node N, but only if their object spaces actually intersect the object space of N. In FIG. 4, if B were to have a descendent node D whose object space immediately surrounded object 3 and hence, did not intersect with A, then D's search space could be described solely in terms of its object space. This permits simplification of the search space description for a CT node. Basically, it is desired to post only information about node N using N's object space description and EI(N). When index terms are posted for higher levels of the C-tree, the complete search space descriptions need to be posted. Avoiding the need to include all preceding node space descriptions simplifies the containment test within the search and saves space in the index.

Clearly, any node M whose object space does not intersect a second node N's object space does not impact N's search space and hence is not in EI(N). More interesting, however, is that there can be cases where M and N have intersecting object spaces but in which M's object space need not be included in the search space description for N, i.e., in EI(N). Referring now to FIG. 9, there is illustrated an example search space 900 where two nodes have intersecting object spaces but where the search space of the later is not impacted by the object space of the earlier. Nodes A and B have object spaces that intersect, but their intersection is contained within the object space for node E, which was created first (in this example). Hence, despite the object space intersection, there is no reason for space from A to be subtracted from B. However, there would need to be a space (E's object space) that is subtracted from both B and A. Thus, E is in both EI(A) and EI(B).

In general, when describing the search space of a CT node N, EI(N) is included as well as ob(N). Further, a node M in EI(N) can itself also have EI(M). EI(A) is then {E}. EI(B) might then initially be described as {E,A}. That is, initially B is described by listing the search space descriptions of the earlier nodes whose object spaces intersect with B. Simplifying the space descriptions as much as possible includes dropping object space descriptions that do not in any way impact the search space. This is what occurred for the special case in the prior section, where it was determined that D could be described solely in terms of its object space. In FIG. 9, EI(B) is simplified to be {E}.

Refinement: A<<B, if A∩B≠φ AND NOT A⊆B NOR B⊆A AND there is no node C such that C<A AND (A∩B)⊆C.

This refinement deals with the situation illustrated in FIG. 9. Without this refinement, A<<B does not imply that any part of A∩B is in A. However, it is safe to use the earlier definition without the added restriction. The result is that more nodes X<<Y are identified even when this is sometimes not the case.

Thus, it is desirable to have a general simplification procedure so that each search space has a description that is as small and simple as possible. This permits the posting of smaller index terms to the C-tree index, where such an index term must accurately describe the search space of each CT node.

Conceptually, all nodes are searched in creation order that were created earlier than node X. For each CT node Y on this list, starting with the earliest such node on the list, if ob(X)∩ob(Y) is null, then Y is not part of EI(X). Otherwise, compare it to prior nodes Z. If ob(Z)⊃ob(X)∩ob(Y) then drop Y from the list. Otherwise, leave Y as a member of EI(X) and proceed to examine the successor of Y on the candidate list. In the example of FIG. 9, E is first encountered on this list and included. Next, A is encountered, and since its object space has a non-empty intersection with B's object space, ob(A)∩ob(B) is checked with respect to nodes already processed. Because ob(E)⊃ob(A)∩ob(B), A is not in EI(B). So it is possible to refine the definition of EI(N) more than the earlier definition, but it requires a more complicated analysis.

Note that having prior nodes Z1 and Z2 on the predecessor list, the union of whose object spaces covers ob(X)∩ob(Y), is not sufficient to remove Y from EI(X). That is because a data object may not be entirely in ob(Z1) or entirely in ob(Z2), yet still be in ob(Z1)∪ob(Z2). However, such a data object will not be in the search space of either Z1 or Z2. However, it can be in ob(X)∩ob(Y).

Full Search Procedure

Figure 10:
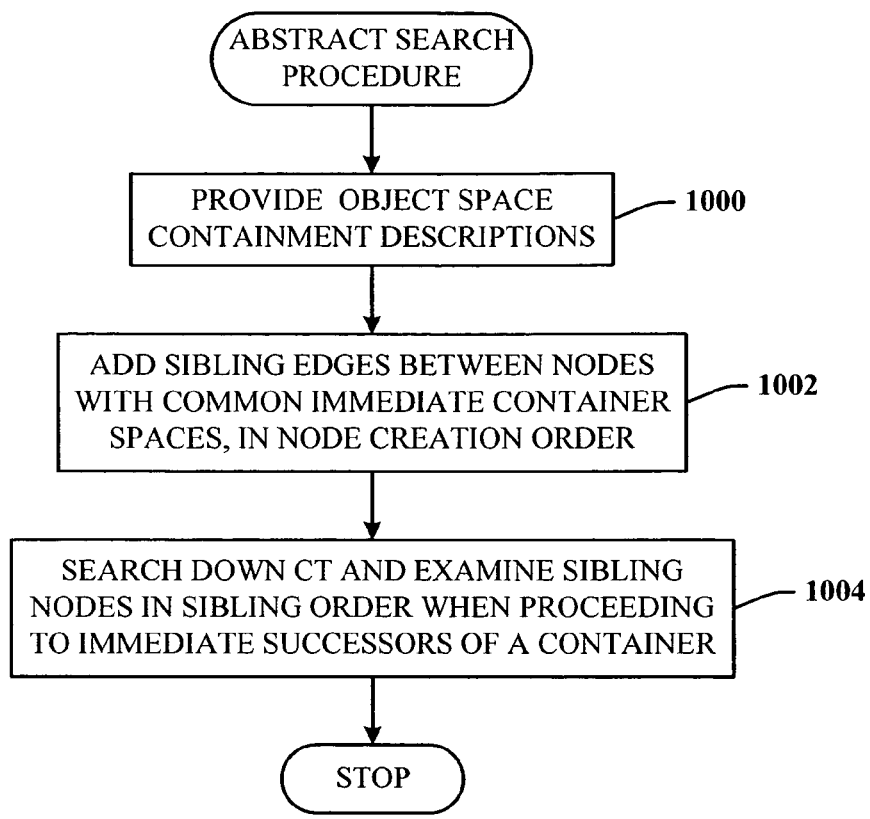
FIG. 10 illustrates a methodology for a full search in accordance with the present invention.

Referring now to FIG. 10, there is illustrated a methodology for a full search in accordance with the present invention. The abstract index search procedure is to search down the CT for the smallest object space that fully contains the requested object. However, the CT no longer consists solely of object space descriptions. Rather, information is included that fully describes the search space by qualifying exactly what part of the object space is in the search space. At 1000, object space containment descriptions are provided. Thus, at 1002, object space containment descriptions are augmented to include EI information by adding sibling edges between nodes with a common immediate container, and in node creation order. This is represented in sibling edges between intersecting (but not nested) CT node object spaces. For example, in FIG. 6, the sibling edge captures the information that the search space of B, since it was created later than A, excludes objects that are within A's object space. This permits the determination that A is the home for objects residing in the intersection of the object spaces of A and B.

A sibling edge should not be thought of as only an edge of the CT. Rather, it can be a modifier for the object space descriptions of all nodes that come later in the sibling list (the modification being that the space in the intersection of the object space of a later node with that of prior nodes is not in the search space of the later node). A list of spaces that intersect with the object space of some node and that are not in its search space could be maintained separately with each node. However, the sibling edges permit avoidance of this separate list by using the description of the object space of the earlier node that is responsible for the excluded space as a way to determine the intersecting space excluded from the search space of the later node.

When searching the CT, the immediate contained successors of a CT node (C in this case) are examined, e.g., A and B. The order in which to examine A and B is according to the order as represented by the sibling edges, thus, examining A before examine B. If an object is contained in the search space of A, there is no need to examine B. Thus, at 1004, searching is down the CT, and examining sibling nodes in sibling order when proceeding to the immediate successors of a container. Searching is in the order defined by sibling edges for the first node whose search space contains the search region.

C-Tree Index Pages

This following describes where to place an index term, how to incorporate full index term descriptors into the CT tree description, and how to simplify the index term descriptors during the updating of the index pages.

Search Space Descriptions

Given the full CT, as would occur at the level of the C-tree just above the data nodes, all the sibling nodes are known, and hence, the exact search space of any given node can be determined. As each new data page P is generated, the index term for it (i.e., its node N in the CT) is added to the previous CT later in the sibling list of its immediate container C than any sibling M for which M<<N. Each sibling P is examined, and becomes a descendent of N if ob(P)⊂ob(N). However, a problem can arise when paginating the full CT tree, and posting search space descriptions to higher levels of the C-tree. Enough information needs to be posted to determine the search space for EI(N) each CT-abstract node (higher level index term) in the C-tree parent page. At the higher levels of the C-tree, not all nodes of the CT will be present. It is desired that the descriptions at the higher C-tree levels be as simple as possible, and be as much as possible like the representation of the full CT at the lowest index level.

Paginating (splitting of an index page P) is done at a node, say X, of the CT (or CT abstract) connected component K contained in P. X is the root of the subtree of K in the new page. X's search space thus becomes the search space for the new C-tree page. Hence it also becomes the search space description posted as an index term to the parent C-tree page. The parent C-tree page has only some of the CT nodes present. Hence, the object space description for X are supplemented with EI(N) information to keep the CT abstract correct. In the full CT at the parent of leaf level in the C-tree, the EI descriptions are available via the CT nodes linked by sibling edges leading to the node, but not so, at the higher levels of the C-tree, where only a CT abstract is available.

When X's object space intersects with object spaces of preceding nodes, not only the object space of X needs to be examined, but also the object spaces of all nodes in EI(X) that might impact the search space covered by the new page. This complete description is posted in the C-tree parent page of the page being split. Thus, each page is described by its object space description and object space descriptions for nodes in EI, some nodes of which have sibling edges to it, and some from nodes of which have sibling edges to ancestors that remove part of the space that the node inherits from its ancestors. In the example of FIG. 4, and the corresponding CT in FIG. 6, node B's search space is described by B's object space, and the EI excluded space of ob(A) n ob(B).

Figure 11:
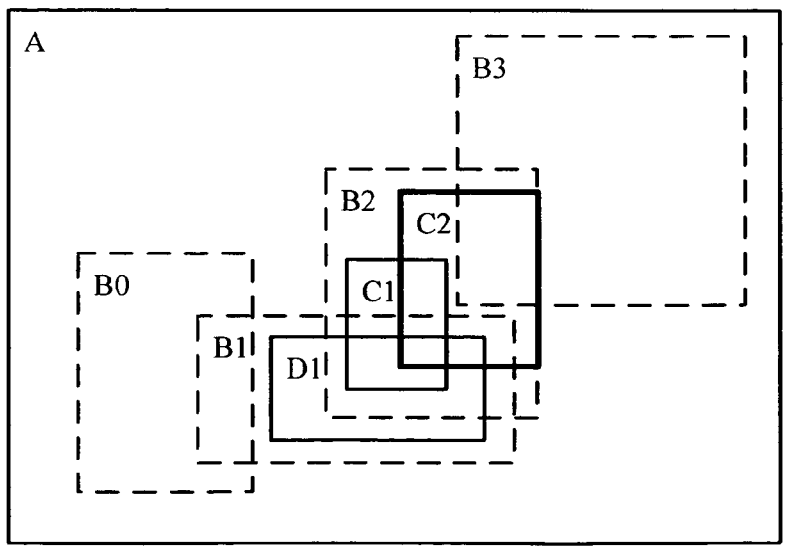
FIG. 11 illustrates an example space decomposition where the object spaces are represented by rectangles.

Referring now to FIG. 11, there is illustrated an example space decomposition 1100 where the object spaces are represented by rectangles. The nodes are labeled such that the Bi nodes are all siblings, the Ci nodes are siblings, and the sibling node creation order is indicated by the value of "i".

Figure 12:
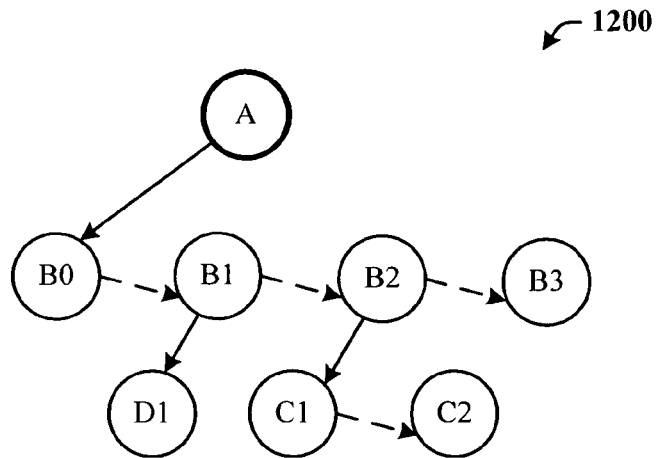
FIG. 12 illustrates a full CT fragment for the space decompositions of FIG. 11 in accordance to the present invention.

FIG. 12 illustrates a full CT fragment for the space decompositions of FIG. 11 in accordance to the present invention.

Figure 13:
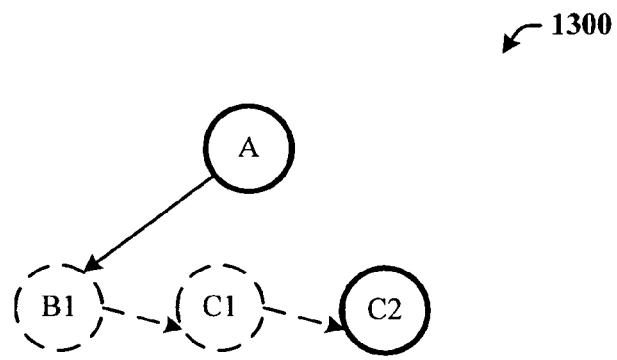
FIG. 13 illustrates a minimum path CT fragment for the space decomposition of FIG. 11, according to the present invention.

FIG. 13 illustrates a minimum path (MP) CT fragment 1300 for the object spaces of FIG. 11, in accordance with the present invention. The concept of minimum path is described in detail in combination with minimum graph hereinbelow. It is assumed that an index term for A has already been posted that describes the page in which the fragment of the CT is contained. One simple way to post an index term for a CT node C2 at which a split is intended, is to include all nodes on the CT path between the already posted node A and the node that is to be posted, C2. This would involve posting B0, B1, B2, C1 in addition to C2. These need to be distinguished from node C2 since these nodes continue to be in the original page referenced by CT node A. Note that the predecessors for A do not need to be posted because A has already been posted with the necessary predecessors. Hence, any search that goes down the CT tree past A would already have survived the exclusions represented by A's predecessors. However, it is desirable to post less than this whenever possible.

Representing C-Tree Index Terms

It is desired to have fewer nodes of one level of the CT being used at the next higher level of the C-tree for the more abstract CT at this higher level. Clearly, the fewer the number of nodes, the better the page fan-out of the C-tree will be.

All index nodes of the C-tree above the bottom index level (which is just above the data pages) constitute "CT-abstracts", i.e., subsets of the CT, and need to be "well-formed", i.e., they need to describe completely within each index page of the C-tree, the search space of each posted CT node. Thus, every time an index term is posted, it is required that the resulting CT abstract in the parent C-tree node includes enough information to fully describe the search space of the new node N, including the impact of nodes in EI(N). The idea here is to next define a subgraph of the CT which captures the fully qualified search space of each index page and use that subgraph to update the CT abstract at the next higher level of the C-tree.

Minimum Path/Minimum Graph

Referring again to FIG. 13, the minimum path for the CT fragment of FIG. 12 an the object spaces of FIG. 11 is described in greater detail. A minimum path MP(A,B) between an ancestor node A and one of its descendent nodes B is a subset of the path in the CT from A to B defined as:

1. A, B in MP(A,B).
2. X not A,B is in MP(A,B) if and only if X<<B and X on the path from A to B in the CT.
3. For X,Y in MP(A,B), if X<<Y then X precedes Y in MP(A,B).
4. For X, Y in MP(A,B), if X ⊃ Y and there is no Z in MP(A,B) such that X ⊃ Z and Z ⊃ Y, then there is a exactly one containment edge on the path from X to Y in MP(A,B). (For MP(A,B), the only containment edge is from A.)
5. Edges that are not containment edges are sibling edges.

If X in MP(A,B) and not A, B, then X is called a ghost node. Ghost nodes can be identified as simply nodes for which a pointer is not included to an associated page. A and B are called posted nodes.

Looking at time of creation (sibling edges are used as a proxy for this) and also at object spaces, containment edges and sibling edges must be constructed. To post an index term for node B, (where B is the root of the CT-abstract connected component in a new page and A is the root of the CT-abstract connected component in the old page which was split) at least MP(A,B) must be posted to the parent page where A has already been posted. The set {X} in MP(A,B) for X not equal to A,B represents the minimum number of nodes descending from A that need to be in the CT-abstract in order to correctly describe the search space of B (at least relative to A). Thus, in a sense, MP(A,B) is the index term for B.

All EI spaces that reduce posted node search space in an index page and that themselves have not been posted, are represented as "ghost" nodes. To find objects in ghost nodes, one goes to the closest containing posted (non-ghost) parent in the CT fragment present in a C-tree index page. This "CT fragment" is described next.

A minimum graph MG(A,D) for an ancestor node A and a set of its posted descendents D consists of:

1. A and all members of D are nodes in MG(A,D).
2. If X is a node of D, then all nodes Y in MP(A,X) are in MG(A,D).
3. For X,Y in MG(A,D), if X<<Y then X precedes Y in MG(A,D).
4. For X, Y in MG(A,D), if X ⊃ Y and there is no Z in MG(A,D) such that X ⊃ Z and Z ⊃ Y, then there is a exactly one containment edge on the path from X to Y in MG(A,B).
5. Edges that are not containment edges are sibling edges.

Similar to ghost nodes in the minimum path, if X in MG(A, D) and not A or in D, then X is called a "ghost" node. A and nodes of D are called posted nodes.

All containment and precedes relationships between these nodes are represented by edges in the MG(A,D), and the edges are distinguished as to sibling or contains. FIG. 13 shows MP(A,C2). B0 is eliminated from MP(A,C2) because not B0<<C2. B2 is eliminated because B2 contains C2 and not B2<<C2. Note that the link between B 1 and C1 is a sibling link in MP(A,C2) although it was not a sibling link in the original CT.

The fewer nodes in MG means that the resulting C-tree index node has a larger fan-out, since the number of nodes needed to represent each index term (MP) is minimized and because the sharing between index terms is maximized in an MG. C-tree index pages only selectively include CT nodes from the lower level of the C-tree. For any set of nodes I posted to an index page P whose search space is specified by node A, (the root of the CT abstract connected component in P) these nodes are represented by MG(A,I).

Node Ordering in MG(A,D)

When only a minimum graph is maintained in a parent index page, it can be difficult to maintain the order needed between nodes of the minimum graph, which serves as a CT abstract at the next higher level of the C-tree. One difficulty is in keeping enough information to correctly order the EI information for each node without redundantly storing node descriptions. Related to this is the difficulty of assigning a node to its correct container among a set of siblings. This is described in detail.

Extended Path/Extended Graph

Figure 14:
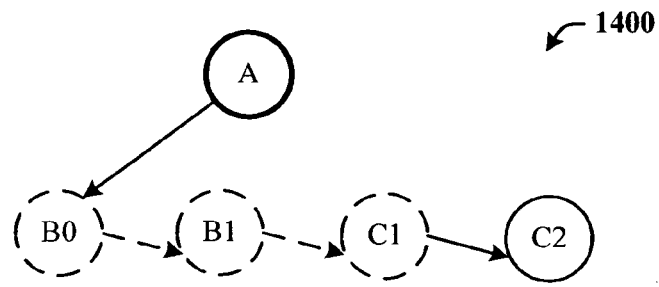
FIG. 14 illustrates a representation of an extended path of the CT of FIG. 13 and objects spaces of FIG. 11, in accordance with the present invention.

Referring now to FIG. 14, there is illustrated an extended path 1400 XP(A,C2) of the full CT of FIG. 12, minimum path CT of FIG. 13 and the object spaces of FIG. 11. An extended path XP(A,B) between an ancestor node A and one of its descendent nodes B is a subset of the path in the CT from A to B defined as:

1. A, B in XP(A,B).
2. X not A, B is in XP(A,B) if and only if X<<Y and Y in XP(A,B) and X on the path from A to B in the CT.
3. For X, Y in XP(A,B), if X<<Y then X precedes Y in XP(A,B).
4. For X, Y in XP(A,B), if X⊃Y and there is no Z in XP(A,B) such that X⊃Z and Z⊃Y, then there is a exactly one containment edge on the path from X to Y in XP(A,B). (For XP(A,B), the only containment edge is from A.)
5. Edges that are not containment edges are sibling edges.

Analogous to ghost nodes in the minimum path, X in XP(A,B) and not A, B, then X is called a ghost node. Ghost nodes can be identified as simply nodes for which a pointer is not included to an associated page. A and B are called posted nodes.

Note that XP(A,B), by item 2 in the properties above, contains not only all nodes Y<<B, but also all nodes Z<<Y. This extended list of nodes permits the maintenance of index pages when posting a new index term.

An extended graph XG(A,D) for a node A and a set of its descendents D consists of:

1. A and all members of D are nodes in XG(A,D).
2. If X is a node of D, then all nodes Y in XP(A,X) are in XG(A,D).
3. For X, Y in XG(A,D), if X<<Y then X precedes Y in XG(A,D).
4. For X, Y in XG(A,D), if X⊃Y and there is no Z in XG(A,D) such that X⊃Z and Z⊃Y, then there is a exactly one containment edge on the path from X to Y in XG(A,B).
5. Edges that are not containment edges are sibling edges.

Analogous to ghost nodes in the minimum graph, if X in XG(A,D) and not A or in D, then X is called a "ghost" node. A and nodes of D are called posted nodes.

XP(A,C2) can serve as an index term for C2 in FIG. 11. It is shown in FIG. 14. Note that B0, B1, and C1 are in XP(A, C2) as "ghost" nodes, there only to fully describe the search space for C2. C2 itself is the posted node. XP(A,B) is used to post B instead of MP(A,B) so as to conveniently be able to maintain the CT abstract in the parent C-tree index page. The result of this is that more ghost nodes are posted. But an important property is that every node that is present in the CT abstract is preceded in the search path by all nodes that earlier/intersect it. This property now applies to ghost nodes as well. Thus, the full ordering information needed for every node is provided.

Node Sequence Numbers

Path index terms need to be merged into a graph that represents a well formed CT-abstract. In order to facilitate this, a sequence number is added to each CT node. This node sequence number (NSN) indicates the order in which the underlying C-tree data page was created. That is, whenever a C-tree data page is split, the new page formed by the split is given an NSN that is one greater than the NSN for the previously generated C-tree data page. Thus, for two nodes M and N, NSN(M)<NSN(N) means that M is earlier than N.

Posting Index Terms to the C-Tree Parent Index Page

Each higher level of a C-tree defines a coarser "abstract" of the immediate lower level CT. Following is a description as to how to provide index terms for each page and how to post those index terms to parent nodes so as to maintain the higher level abstract of the CT. The index term is posted for each page of the CT in the parent page, and this pagination is applied recursively to higher levels of the C-tree.

Recall that XP(A,B) will serve as the index term for B in a parent index page that already includes node A. XP(A,B) is posted, but only MP(A,B) defines the search space for B. Finding the right place for XP(A,B) is similar to finding the right place for an object during an ordinary tree search. Both index term and object have object space descriptions. However, a node B's object space needs to be modified by the object spaces of index terms for nodes X that modify its search space, i.e., where X<<B.

Finding the Containing Node

Figure 15:
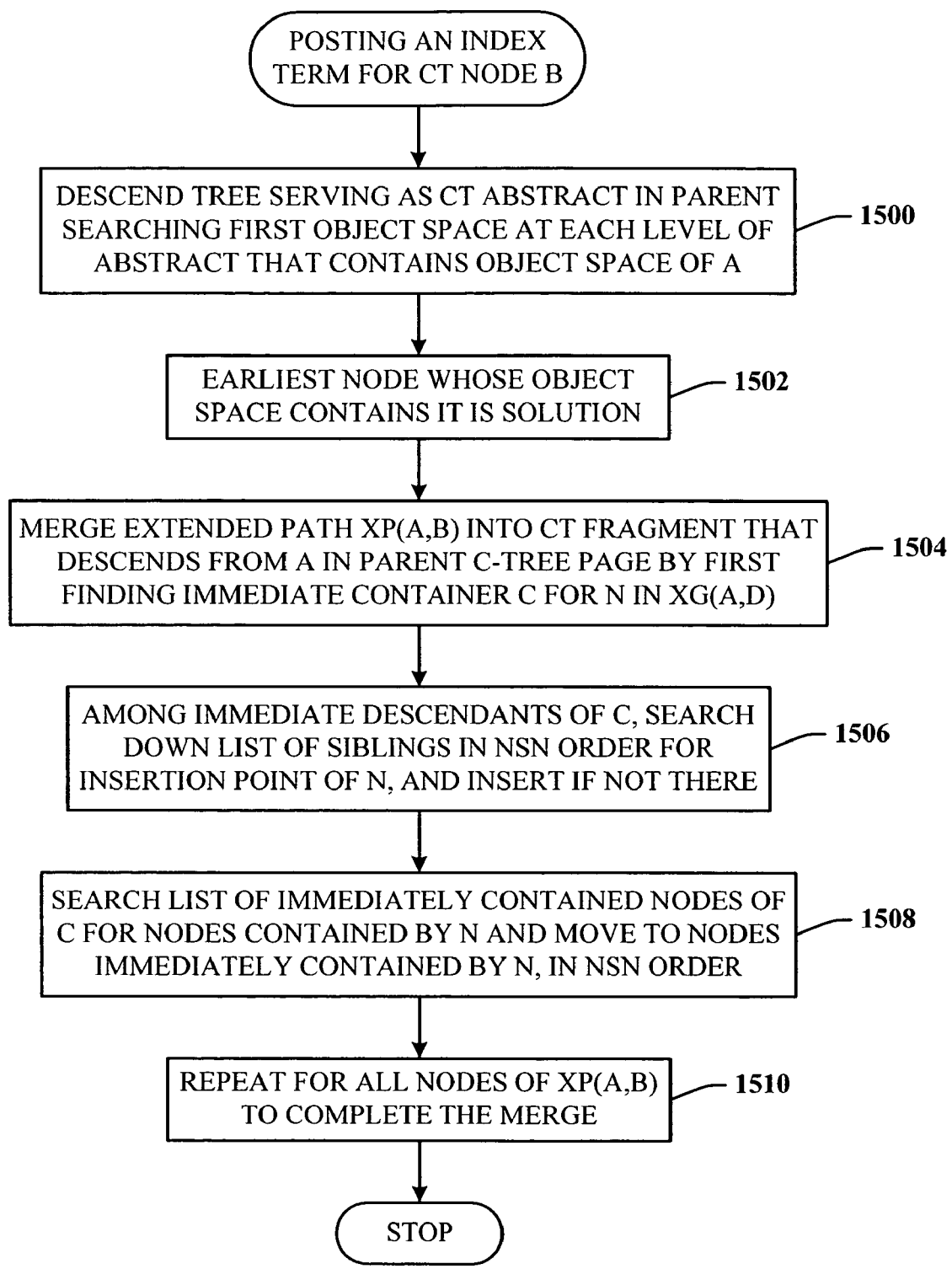
FIG. 15 illustrates a methodology for finding a containing node and posting an index term for a CT node B in accordance with the present invention.

Referring now to FIG. 15, there is illustrated a methodology of finding a containing node and for posting an index term for CT node B in accordance with the present invention. To post an index term for node B, start by looking for node A, which is called the containing node for B. It is the smallest containing node for B that has already been posted (though other ghost containers may exist). The reason node B is posted is that a page P has split containing a connected component of a CT abstract whose root was the node A. The object space description of A is contained in C-tree parent page P. The CT "abstract" tree needs to be searched in the parent page for the object space associated with A. At 1500, the tree serving as the CT abstract in the parent page P is descended, looking for the first object space at each level of the CT abstract that contains the object space of A. Because of restriction R2, finding the immediate container A for an index term XP(A,B) is exactly the same search procedure as looking for an object that has A's object space description. Because of restriction R2, A has a unique location in the earliest node whose object space contains it, as indicated at 1502.

Adding a New Index Term to Parent C-Tree Page

Having found node A, the containing node for B, XP(A,B) is merged into the CT fragment that descends from A in the parent C-tree page P. This CT fragment is XG(A,D) for all the nodes D already posted immediately under A in the parent page P. The end result is a new extended graph XG(A, D∪{B}). This new extended graph preserves all orderings X<<Y so as to be a correct extended graph. It also preserves all c (containment) orderings among nodes with their object space descriptions.

Because of restriction R1, each node need appear only once in the resulting extended graph, either as a ghost node or as a posted node. So the merge of extended path into extended graph can be affected without duplicating object space descriptions.

The algorithm for merging extended path XP(A,B) into extended graph XG(A,D) has the following steps for each node N of XP(A,B) processed in order from A to B.

1. At 1504, find the immediate container C for N in XG(A, D)
2. Among the immediate descendents of C, search down the list of siblings (which are maintained in NSN order) for the place to insert N. Insert it there if it is not already present, as indicated at 1506.
3. At 1508, search the list of immediately contained nodes of C for nodes contained by N and move these nodes to be nodes immediately contained by N, in NSN order.
4. At 1510, repeat this for all nodes of XP(A,B), eventually posting B, at which point XG(A,D∪{B}) is created.

There are optimizations that can be made for this procedure. For example, if the insertion point of an earlier node of XP(A,B) in XG(A,D) is remembered, the next search (step 1) can begin at this point in XG(A,D), rather than starting again from node A.

XP(A,B) is used instead of MP(A,B) because of step 3. All earlier/intersecting nodes of N are processed before N to ensure that when N is made into a container of other nodes, it is the first node whose object space contains the nodes.

C-Tree Node Deletion

Figure 16:
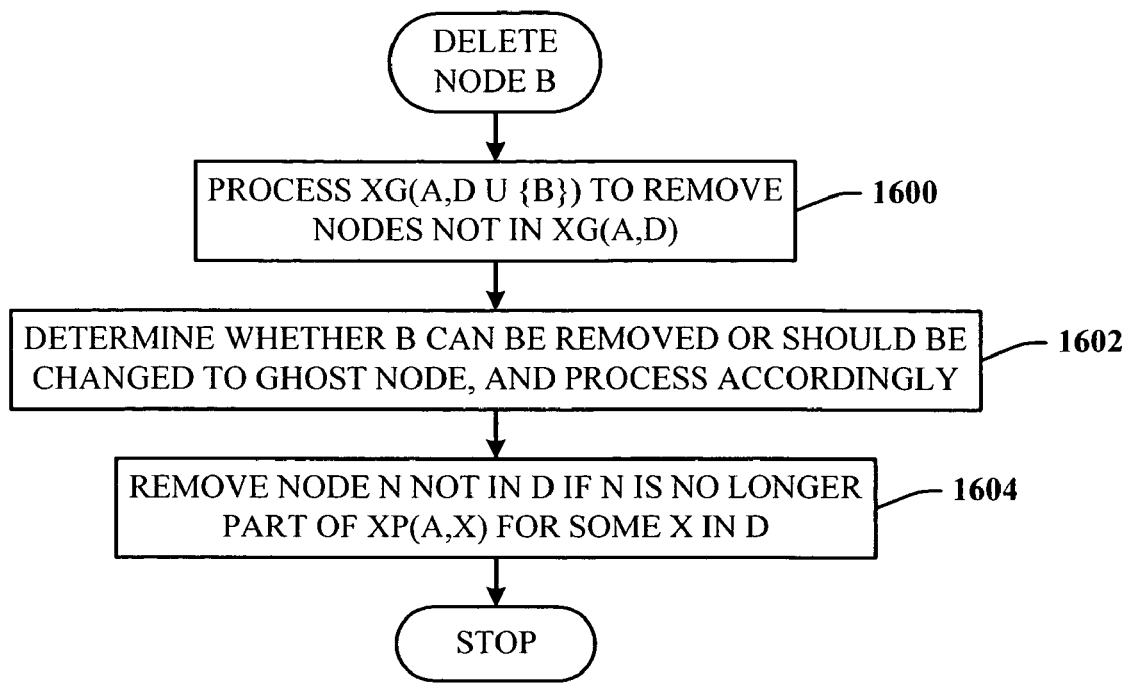
FIG. 16 illustrates a methodology of deleting a C-tree node in accordance with the present invention.

Referring now to FIG. 16, there is illustrated a methodology of deleting a C-tree node in accordance with the present invention. When a C-tree node B is deleted, its index term is removed from the C-tree parent page. In furtherance thereof, it is desired to change an extended graph XG(A,D∪{B}) to XG(A,D). For this, at 1600, the entire extended graph from A is processed so as to check whether to remove the nodes N in XG(A,D) but not in D (i.e., ghost nodes) to remove nodes that are no longer needed. Additionally, at 1602, one also needs to determine whether B can be removed or whether B should be changed merely to a ghost node. At 1604, remove the node N not in D if N is no longer part of XP(A,X) for some X in D. The node is then processed accordingly.

If for node N, not N<<M for any other node M in XG(A,D), then it can be removed. This test is repeated for every node N on the path from A to B, including B, as this path will include XP(A,B).

Searching for a Single Object

Figure 17:
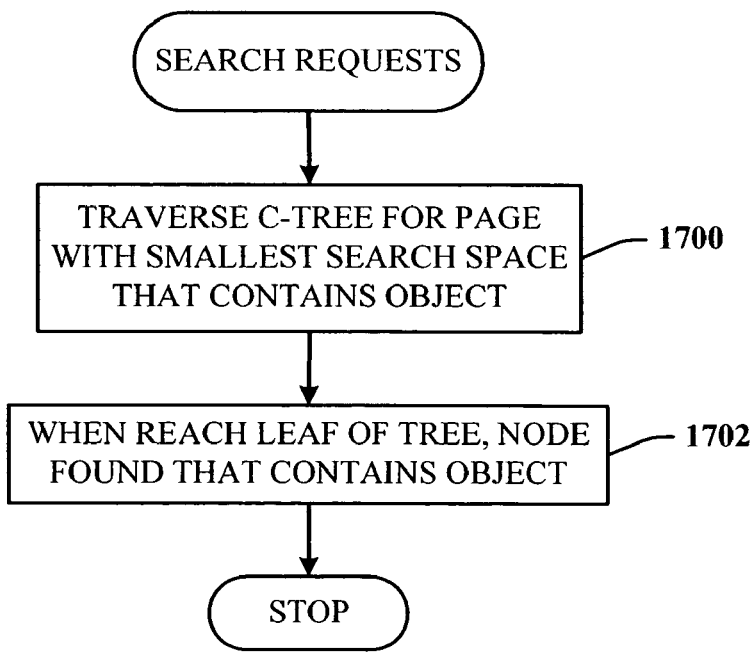
FIG. 17 illustrates a methodology for performing a search request in accordance with the present invention.

Referring now to FIG. 17, there is illustrated a methodology for searching for a single object in accordance with the present invention. Searching, in order to find a single object within a C-tree or to insert or update a single object, is very fast and direct. There is only one path to the object. In a small number of cases, the path includes side pointer traversals. Hence, these kinds of searches have the same page access performance as B-link trees, and usually performance equal to B-trees, as side traversals are relatively rare. This is better than the usual case with R-trees, where multiple paths may need to be followed when object space descriptions overlap. This search is a special case of a range search for objects contained in the requested space. In either case, at 1700, the C-tree is traversed looking for the page with the smallest search space that contains the object. When reaching the leaf of the tree, the node is found that contains (or should contain) the object, as indicated at 1702.

Range search performance is, in general, harder to characterize. Search space partitioning performed by the C-tree works well. In the following subsections, some forms of range query are addressed when data objects can have areal extents. Point object ranges are included in the following "contained in request space" section.

Searching for Objects "Contained in" Request Space

For C-trees, there is a unique page at each level that is described with the smallest search space containing the request space. Searching for such a range is different from searching for an object, even if the spaces are described in exactly the same way. For example, if object A intersects the search space of a page P, P will not contain A, but P might contain objects that are within a range search space request that has the same description as A. Nonetheless, there is a single path down the C-tree, searching for a data page that is the smallest container of A. At the data level, the search starts for the objects in the request space. All objects in the request space are reachable via side pointers from the data page that contains the range search space. No search is required in any page whose object space is disjoint with the request space. Moreover, all pages whose object space is contained within the request space only have data that is in the answer set.

Note that the smaller the request space, the more the tree traversal cost will dominate (as opposed to a side pointer following at the data page level of the C-tree), as with point queries. Thus, the C-tree performs better for small request spaces than the R-tree, while being comparable for larger request spaces.

Searching for Objects "Containing" the Request Space

For this type of search, the process starts at the data page with the search space equal to the entire search space. The search proceeds via side pointers to pages whose search space contains the request space. If a page P's search space does not contain the request space, no object containing the request space can be in P's search space. The pages satisfying this search will always include the pages with the largest objects, and will exclude most pages with small search space, which contain only small objects.

The C-tree clusters large objects into a small number of pages, even though it indexes the entire search space. The very large containing objects are likely to be in a very few C-tree pages (if not, then the C-tree will need to have pages whose object space overlaps substantially, and that cover enough object space to contain the large objects). These pages will be part of the answer set of data pages for almost all "containing" queries (and "intersecting" queries as well). Hence, they are likely to be cached in main memory and not incur extra I/O costs to access them. Because of this, the C-tree should perform very well on these queries.

Searching for Objects Intersecting the Request Space

Requests for all objects intersecting the request space will include the objects from both the preceding queries, plus additional objects that neither contain nor are contained within the request space. As with the "containing" query, the pages with the largest object space are in the retrieved set for all these queries. Further, all the pages whose object spaces are contained within the request region, are part of the answer. Thus, as the search traverses from the data page whose declared space is the universe, and visits other data pages through side pointers, the disclosed mechanism only fails to search pages whose object space is disjoint from the request space. Any of the other pages can contain data that intersects the query region. Again, the largest pages with large object spaces can be expected to be permanently cached such that I/O is not required to search them.

Optimization

One optimization that can be employed includes a learning technique that learns the degree to which the query regions topologically resemble the regions where data is stored. Knowing the workload, the object spaces of data pages can be organized and shaped to look like query regions of the workload. But this could restrict the patterns for splitting pages so that space utilization may be affected. Also, it might keep one from using only one hyperplane and thus one data value to describe a split.

Computing System

Figure 18:
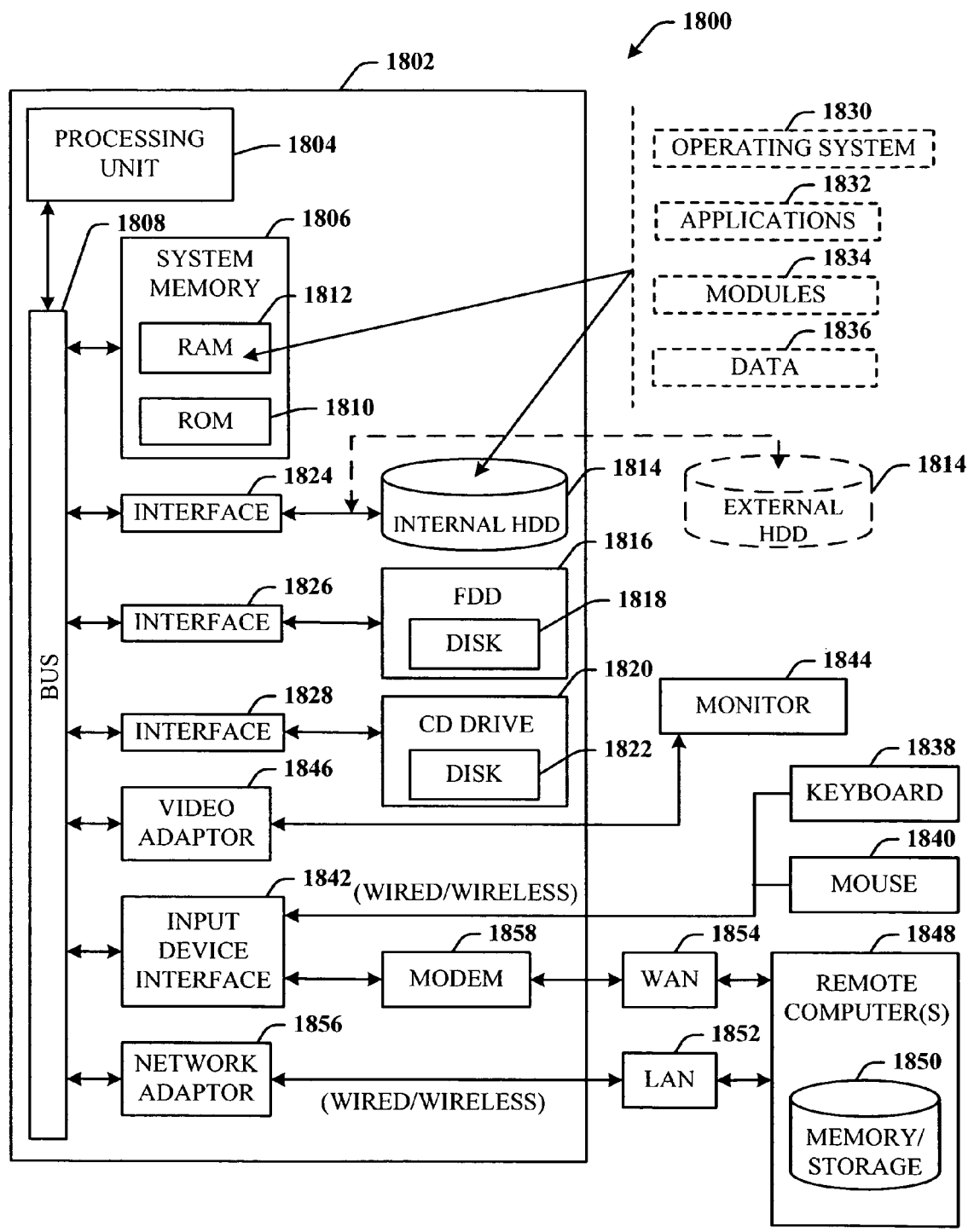
FIG. 18 illustrates a block diagram of a computer operable to execute the disclosed architecture.

Referring now to FIG. 18, there is illustrated a block diagram of a computer operable to execute the disclosed architecture. In order to provide additional context for various aspects of the present invention, FIG. 18 and the following discussion are intended to provide a brief, general description of a suitable computing environment 1800 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 18, there is illustrated an exemplary environment 1800 for implementing various aspects of the invention includes a computer 1802, the computer 1802 including a processing unit 1804, a system memory 1806 and a system bus 1808. The system bus 1808 couples system components including, but not limited to the system memory 1806 to the processing unit 1804. The processing unit 1804 may be any of various commercially available processors. Dual microprocessors and other multi-processor architectures also can be employed as the processing unit 1804.

The system bus 1808 can be any of several types of bus structure including a memory bus or memory controller, a peripheral bus and a local bus using any of a variety of commercially available bus architectures. The system memory 1806 includes read only memory (ROM) 1810 and random access memory (RAM) 1812. A basic input/output system (BIOS), containing the basic routines that help to transfer information between elements within the computer 1802, such as during start-up, is stored in the ROM 1810.

The computer 1802 further includes a hard disk drive 1814, a magnetic disk drive 1816, (e.g., to read from or write to a removable disk 1818) and an optical disk drive 1820, (e.g., reading a CD-ROM disk 1822 or to read from or write to other optical media). The hard disk drive 1818, magnetic disk drive 1816 and optical disk drive 1820 can be connected to the system bus 1808 by a hard disk drive interface 1824, a magnetic disk drive interface 1826 and an optical drive interface 1828, respectively. The drives and their associated computer-readable media provide nonvolatile storage of data, data structures, computer-executable instructions, and so forth. For the computer 1802, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1812, including an operating system 1830, one or more application programs 1832, other program modules 1834 and program data 1836. It is appreciated that the present invention can be implemented with various commercially available operating systems or combinations of operating systems.

A user can enter commands and information into the computer 1802 through a keyboard 1838 and a pointing device, such as a mouse 1840. Other input devices (not shown) may include a microphone, an IR remote control, a joystick, a game pad, a satellite dish, a scanner, or the like. These and other input devices are often connected to the processing unit 1804 through a serial port interface 1842 that is coupled to the system bus 1808, but may be connected by other interfaces, such as a parallel port, a game port, a universal serial bus ("USB"), an IR interface, etc. A monitor 1844 or other type of display device is also connected to the system bus 1808 via an interface, such as a video adapter 1846. In addition to the monitor 1844, a computer typically includes other peripheral output devices (not shown), such as speakers, printers etc.

The computer 1802 may operate in a networked environment using logical connections to one or more remote computers, such as a remote computer(s) 1848. The remote computer(s) 1848 may be a workstation, a server computer, a router, a personal computer, portable computer, microprocessor-based entertainment appliance, a peer device or other common network node, and typically includes many or all of the elements described relative to the computer 1802, although, for purposes of brevity, only a memory storage device 1850 is illustrated. The logical connections depicted include a local area network (LAN) 1852 and a wide area network (WAN) 1854. Such networking environments are commonplace in offices, enterprise-wide computer networks, intranets and the Internet.

When used in a LAN networking environment, the computer 1802 is connected to the local network 1852 through a network interface or adapter 1856. The adaptor 1856 may facilitate wired or wireless communication (wireless according to an IEEE 802.11 standard) to the LAN 1852, which may also include a wireless access point disposed thereon for communicating with the wireless adaptor 1856. When used in a WAN networking environment, the computer 1802 typically includes a modem 1858, or is connected to a communications server on the LAN, or has other means for establishing communications over the WAN 1854, such as the Internet. The modem 1858, which may be internal or external, is connected to the system bus 1808 via the serial port interface 1842. In a networked environment, program modules depicted relative to the computer 1802, or portions thereof, may be stored in the remote memory storage device 1850. It will be appreciated that the network connections shown are exemplary and other means of establishing a communications link between the computers may be used.

Figure 19:
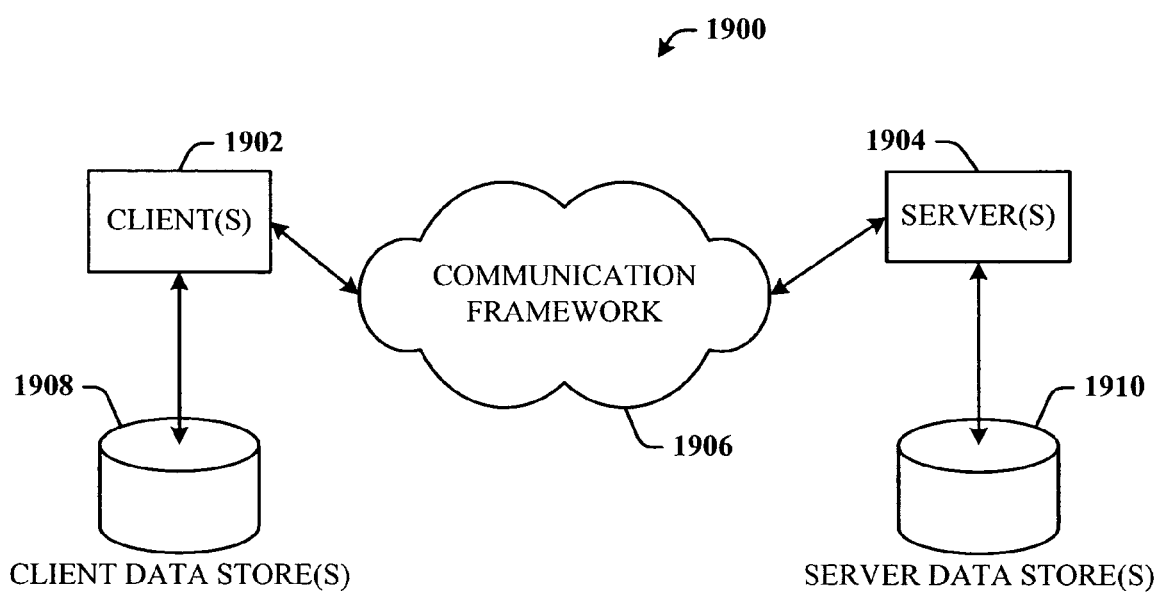
FIG. 19 illustrates a schematic block diagram of an exemplary computing environment in accordance with the present invention.

Referring now to FIG. 19, there is illustrated a schematic block diagram of an exemplary computing environment 1900 in accordance with the present invention. The system 1900 includes one or more client(s) 1902. The client(s) 1902 can be hardware and/or software (e.g., threads, processes, computing devices). The client(s) 1902 can house cookie(s) and/or associated contextual information by employing the present invention, for example. The system 1900 also includes one or more server(s) 1904. The server(s) 1904 can also be hardware and/or software (e.g., threads, processes, computing devices). The servers 1904 can house threads to perform transformations by employing the present invention, for example. One possible communication between a client 1902 and a server 1904 may be in the form of a data packet adapted to be transmitted between two or more computer processes. The data packet may include a cookie and/or associated contextual information, for example. The system 1900 includes a communication framework 1906 (e.g., a global communication network such as the Internet) that can be employed to facilitate communications between the client(s) 1902 and the server(s) 1904. Communications may be facilitated via a wired (including optical fiber) and/or wireless technology. The client(s) 1902 are operably connected to one or more client data store(s) 1908 that can be employed to store information local to the client(s) 1902 (e.g., cookie(s) and/or associated contextual information). Similarly, the server(s) 1904 are operably connected to one or more server data store(s) 1910 that can be employed to store information local to the servers 1904.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An indexing system, comprising:
    a memory;
    a C-tree contained in memory that exploits search space containment in connection with indexing a database, wherein the C-tree comprises a plurality of disk-based leaf (data) pages, each of the leaf (data) pages associated with a declared home search space that does not change as index terms are added, at least one leaf (data) page containing a side pointer to another leaf (data) page associated with a declared side search space, the search spaces forming a fragment of a containment tree, the C-tree further comprising a page level above the leaf level of the containment tree indexing structure as a collection of index pages that contain a complete containment tree, each page containing a plurality of nodes wherein each node of the containment tree denotes one leaf (data) page of the containment tree and search spaces for the nodes of the containment tree act as index terms for the leaf (data) page in the containment tree, wherein the C-tree handles data page index terms with extended object space descriptions formed by excluding the overlapping object spaces of pages that were created earlier; and
    a query component that receives a search request from the database and returns one or more objects associated with the C-tree satisfying the search request, wherein when an original index page of the C-tree splits into a first and second index page by moving subtree from the original index page to the second index page, a containment-tree node in the first index page has a search space description of a root of the moved subtree of the second index page and a side pointer to the second index page enabling reconstruction of an original containment tree without the second index page containing a side pointer to the first index page.

2. The system of claim 1, wherein the C-tree handles at least one of spatial data, temporal data, and other multi-attribute data.

3. The system of claim 1, being premised on a notion of an object being contained in a search space.

4. The system of claim 1, further comprising concurrency control and recovery associated with at least one of a Pi-tree and a B-link-tree.

5. The system of claim 1, wherein the search space is treated as distinct from the object space description in order to process object space descriptions that can overlap.

6. The system of claim 1, wherein the search space further comprises overlapping objects that are separated into disjoint partitions of the search space.

7. The system of claim 1, wherein an object contained in both a first page's space and a second page's space belongs to the one of the first page and the second page that was first instantiated.

8. The system of claim 1, wherein the C-tree further comprises leaf (data) pages and side pointers that form the containment tree that can be searched for a page with the smallest search space containing a requested space.

9. The system of claim 1, wherein the C-tree further comprises a plurality of levels, each of which contains a more abstract containment tree structure and that indexes a lower level.

10. The system of claim 9, wherein the search space containment tree is paginated and indexed using only object space descriptions of nodes in the containment tree.

11. A computer that employs the system of claim 1.

12. The system of claim 1, wherein when a page of the C-tree splits, a corresponding new node is formed in an associated containment tree.

13. The system of claim 1, an object space of earlier intersecting sibling nodes is part of a search space description for a node in an associated containment tree.

14. An abstract indexing system that comprises:
    a memory;
    object spaces contained in memory that overlap and search spaces that are disjoint, the object spaces formed by a C-tree indexing structure comprising a leaf level a plurality of leaf (data) pages containing data for querying, a side pointer in at least one leaf (data) page that points to another leaf (data) page, and a fragment of a containment tree in each of the plurality of leaf (data) pages, the fragment describing a home search space of the respective leaf (data) page and a search space of the leaf (data) page pointed to by the side pointer, the C-tree indexing structure further comprising a page level above the leaf level as a collection of index pages that contain a complete containment tree, each page containing a plurality of nodes wherein each node of the containment tree denotes one leaf (data) page of the containment tree and search spaces for the nodes of the containment tree act as index terms for the leaf (data) page in the containment tree; and
    a query component that searches via the search spaces and returns one or more objects satisfying a search request, wherein when an original index page of the C-tree splits into a first and second index page by moving subtree from the original index page to the second index page, a containment-tree node in the first index page has a search space description of a root of the moved subtree of the second index page and a side pointer to the second index page enabling reconstruction of an original containment tree without the second index page containing a side pointer to the first index page.

15. The system of claim 14, wherein every part of the search space is indexed in an index by a corresponding node.

16. The system of claim 15, wherein every object has a unique location in the index.

17. The system of claim 14, wherein the leaves correspond to pages that form a containment tree based on search space containment and sibling index terms.

18. The system of claim 17, wherein the containment tree is paginated.

19. The system of claim 17, wherein the containment tree is used directly to find a unique data page in which an object resides.

20. An indexing methodology, comprising:
receiving data in connection with a relational database;
employing a C-tree in connection with indexing the database, the C-tree comprising a plurality of pages, each of the pages associated with a declared search space that does not change, the plurality of pages comprising a leaf level and a page level, wherein the leaf level comprises a plurality of leaf (data) pages containing data for querying, a side pointer in at least one leaf (data) page that points to another leaf (data) page, and a fragment of a containment tree in each of the plurality of leaf (data) pages, the fragment describing a home search space of the respective leaf (data) page and a search space of the leaf (data) page pointed to by the side pointer, wherein the page level above the leaf level comprises a collection of index pages that contain a complete containment tree, each page containing a plurality of nodes wherein each node of the containment tree denotes one leaf (data) page of the containment tree and search spaces for the nodes of the containment tree act as index terms for the leaf (data) page in the containment tree;
receiving a search request to find an object within the C-tree; and
indicating the object that satisfies the request, wherein when an original index page of the C-tree splits into a first and second index page by moving subtree from the original index page to the second index page, a containment-tree node in the first index page has a search space description of a root of the moved subtree of the second index page and a side pointer to the second index page enabling reconstruction of an original containment tree without the second index page containing a side pointer to the first index page.

21. The method of claim 20, further comprising exploiting search space containment via the C-tree.

22. The method of claim 20, further comprising indexing at least one of spatial data and temporal data.

23. The method of claim 20, further comprising transforming an object space into the search space description by interpreting an object space description, to keep the space description compact.

24. The method of claim 20, wherein the C-tree facilitates defining a search space that accommodates multi-dimensional data.

25. A computer-implemented method for forming an abstract indexing structure that can handle a greater variety of data, comprising:

processing on a processor the computer implemented method for forming an abstract indexing structure that can handle a greater variety of data;
storing on a computer readable storage media computer-executable instructions that, when executed by the processor, performs the computer implemented method for forming an abstract indexing structure that can handle a greater variety of data;
defining a leaf level of a containment tree indexing structure by providing a plurality of leaf (data) pages containing data for querying,
inserting a side pointer in at least one leaf (data) page that points to another leaf (data) page, and
inserting a fragment of a containment tree in each of the plurality of leaf (data) pages, the fragment describing a home search space of the respective leaf (data) page and a search space of the leaf (data) page pointed to by the side pointer;
defining a page level above the leaf level of the containment tree indexing structure as a collection of index pages that contain a complete containment tree, each page containing a plurality of nodes wherein each node of the containment tree denotes one leaf (data) page of the containment tree and search spaces for the nodes of the containment tree act as index terms for the leaf (data) page in the containment tree; and
defining a plurality of upper levels, each containing a subset of nodes of the containment tree of the page level, each having a space description associated with index pages of the page level, wherein when an original index page of the C-tree splits into a first and second index page by moving subtree from the original index page to the second index page, a containment-tree node in the first index page has a search space description of a root of the moved subtree of the second index page and a side pointer to the second index page enabling reconstruction of an original containment tree without the second index page containing a side pointer to the first index page.

26. The indexing system of claim 1, wherein the C-tree further comprises a plurality of upper levels, each containing a subset of nodes of the containment tree of the page level, each having a space description associated with index pages of the page level.

27. The abstract indexing system of claim 14, wherein the C-tree indexing structure further comprises a plurality of upper levels, each containing a subset of nodes of the containment tree of the page level, each having a space description associated with index pages of the page level.

28. The indexing methodology of claim 20, wherein the plurality of pages further comprises a plurality of upper levels, each containing a subset of nodes of the containment tree of the page level, each having a space description associated with index pages of the page level.

* * * * *

UNITED STATES PATENT AND TRADEMARK OFFICE
CERTIFICATE OF CORRECTION

PATENT NO. : 7,668,845 B1  
APPLICATION NO. : 10/891583  
DATED : February 23, 2010  
INVENTOR(S) : David Lomet et al.

Page 1 of 1

It is certified that error appears in the above-identified patent and that said Letters Patent is hereby corrected as shown below:

In column 15, line 16, after "A<<B, if" insert -- A ( B AND --.

Signed and Sealed this  
First Day of February, 2011

David J. Kappos  
*Director of the United States Patent and Trademark Office*